US012762624B2

(12) United States Patent
Sundermann et al.

(10) Patent No.: US 12,762,624 B2
(45) Date of Patent: Oct. 13, 2026

(54) AIRBORNE AND/OR SPACEBORNE OPTICAL FLOOD AND FLOOD DAMAGE SENSORY SYSTEM AND METHOD THEREOF

(71) Applicant: Swiss Reinsurance Company Ltd., Zürich (CH)

(72) Inventors: Lukas Sundermann, Zürich (CH); Vipin Kozhikkoottingal Sreenivasan, Bengaluru (IN); Aaron Michel, Seattle, WA (US); Carl Bernier, Kensington, MD (US)

(73) Assignee: Swiss Reinsurance Company Ltd., Zurich (CH)

(*) Notice: Subject to any disclaimer, the term of this patent is extended or adjusted under 35 U.S.C. 154(b) by 351 days.

(21) Appl. No.: 18/455,940

(22) Filed: Aug. 25, 2023

(65) Prior Publication Data

US 2023/0401651 A1 Dec. 14, 2023

Related U.S. Application Data

(63) Continuation of application No. PCT/EP2022/080753, filed on Nov. 3, 2022.

(30) Foreign Application Priority Data

Nov. 3, 2021 (CH) .......................... CH070500/2021

(51) Int. Cl.
*G06Q 40/08* (2012.01)
*G01W 1/10* (2006.01)
(Continued)

(52) U.S. Cl.
CPC .............. *G06Q 40/08* (2013.01); *G01W 1/10* (2013.01); *G01W 1/14* (2013.01); *G06N 3/0464* (2023.01);
(Continued)

(58) Field of Classification Search
CPC ........ G06Q 40/08; G06Q 10/04; G06Q 20/10; G06N 3/0464; G06N 3/084; G06N 3/126;
(Continued)

(56) References Cited

U.S. PATENT DOCUMENTS

| | | | | |
|---|---|---|---|---|
| 8,655,595 B1 * | 2/2014 | Green | G06Q 40/08 705/4 |
| 2009/0054079 A1 * | 2/2009 | Dubinsky | G06Q 20/105 455/556.1 |

(Continued)

FOREIGN PATENT DOCUMENTS

| | | | |
|---|---|---|---|
| CN | 111259876 A * | 6/2020 | G06F 18/214 |
| EP | 2003610 A1 * | 12/2008 | G06Q 40/08 |

(Continued)

OTHER PUBLICATIONS

International Search Report mailed Feb. 27, 2023 in International Application No. PCT/EP2022/080753.

(Continued)

*Primary Examiner* — John H Le
(74) *Attorney, Agent, or Firm* — Oblon, McClelland, Maier & Neustadt, L.L.P.

(57) ABSTRACT

The invention relates to automated airborne and/or spaceborne optical flood sensory and flood impact sensory method and system for measuring and/or forecasting a weightage-specific, quantitative flooding measure value and/or a weightage-specific, quantified flooding impact extent measure value, the weightage being based on an object density of a selected topographic and/or geographic area impacted by an occurrence of a flood event.

27 Claims, 24 Drawing Sheets

(51) Int. Cl.

| | |
|---|---|
| ***G01W 1/14*** | (2006.01) |
| ***G06N 3/0464*** | (2023.01) |
| ***G06N 3/084*** | (2023.01) |
| ***G06Q 10/04*** | (2023.01) |
| ***G06Q 20/10*** | (2012.01) |
| ***G06V 20/13*** | (2022.01) |

(52) U.S. Cl.
CPC ............ *G06N 3/084* (2013.01); *G06Q 10/04* (2013.01); *G06Q 20/10* (2013.01); *G06V 20/13* (2022.01)

(58) Field of Classification Search
CPC ........ G06N 3/088; G06N 3/02; G06N 3/0499; G06N 3/09; G06N 3/042; G06N 20/00; G06N 5/046; G06N 5/04; G01W 1/10; G01W 1/14; G01W 1/00; G01W 1/02; G01W 1/16; G01W 2203/00; G06V 20/13; G06V 20/194; G06V 20/10; G06V 20/38; G06V 20/17; G06V 10/7715; G06V 10/764; G06V 10/7784; G06V 10/82; Y02A 10/40; Y02A 50/00; Y02A 20/20; Y02A 90/30
USPC .......... 73/170.16, 170.29, 170.24, 384, 660; 340/601, 540, 539.1, 905, 539.28, 521, 340/539.11, 539.26, 539.13, 870.07, 340/995.1; 342/26 R, 104, 118, 460, 342/26 A, 26 B, 357.2, 191, 179; 382/154, 156, 162, 113; 702/5, 3, 2, 188, 702/182, 12, 189, 127, 1, 55, 15, 185, 4, 702/92, 8, 158, 152, 99
See application file for complete search history.

(56) References Cited

U.S. PATENT DOCUMENTS

| | | | | |
|---|---|---|---|---|
| 2018/0075537 | A1* | 3/2018 | Kaplan .................. | G06Q 40/08 |
| 2018/0165616 | A1* | 6/2018 | Sun ........................ | G06Q 10/06 |

FOREIGN PATENT DOCUMENTS

| | | | | |
|---|---|---|---|---|
| WO | 2006/002566 A1 | | 1/2006 | |
| WO | WO-2007009268 A1 | * | 1/2007 | .......... G06Q 10/067 |

OTHER PUBLICATIONS

Jiang Xin et al, "Rapid and large-scale mapping of flood inundation via integrating spaceborne synthetic aperture radar imagery with unsupervised deep learning", ISPRS Journal of Photogrammetry and Remote Sensing, Amsterdam [U.A.] : Elsevier, Amsterdam, NL, , Jun. 9, 2021 (Jun. 9, 2021), vol. 178, pp. 36-50, XP086710755, ISSN: 0924-2716, DOI: 10.1016/J.ISPRSJPRS.2021.05.019.

* cited by examiner

Limit: 100

Payout 57.14

Grid cells (1 of flooded)

| | A | B | C | D |
|---|---|---|---|---|
| 1 | 0 | 0 | 1 | 1 |
| 2 | 0 | 1 | 1 | 1 |
| 3 | 0 | 1 | 1 | 0 |
| 4 | 0 | 1 | 0 | 0 |

Grid cells weight absolut

| | A | B | C | D |
|---|---|---|---|---|
| 1 | 1 | 1 | 1 | 1 |
| 2 | 5 | 8 | 2 | 1 |
| 3 | 8 | 9 | 5 | 1 |
| 4 | 2 | 1 | 2 | 1 |

Grid cells weight relative

| | A | B | C | D |
|---|---|---|---|---|
| 1 | 0.02 | 0.02 | 0.02 | 0.02 |
| 2 | 0.10 | 0.16 | 0.04 | 0.02 |
| 3 | 0.16 | 0.18 | 0.10 | 0.02 |
| 4 | 0.04 | 0.02 | 0.04 | 0.02 |

Grid cells payout

| | A | B | C | D |
|---|---|---|---|---|
| 1 | - | - | 2.04 | 2.04 |
| 2 | - | 16.33 | 4.08 | 2.04 |
| 3 | - | 18.37 | 10.20 | - |
| 4 | - | 2.04 | - | - |

7

Fig. 4

AIRBORNE AND/OR SPACEBORNE OPTICAL FLOOD AND FLOOD DAMAGE SENSORY SYSTEM AND METHOD THEREOF

CROSS-REFERENCE TO RELATED APPLICATIONS

This application is a continuation of and claims benefit under 35 U.S.C. § 120 to International Application No. PCT/EP2022/080753 filed on Nov. 3, 2022, which is based upon and claims priority to Swiss Application No. 070500/2021, filed Nov. 3, 2021, the entire contents of each of which are hereby incorporated herein by reference.

FIELD OF THE INVENTION

The field of the invention is directed towards automated systems providing parametric flood event impact cover to one or more physical objects located in a selected geographic and/or topographic area based on forward-looking measurements of occurrences and occurrence rates of measurable physical impacts of catastrophic events, in particular measurably impacting natural events as flood, storm, hurricanes or tsunami events. The measurements related to measurands depending on the location-dependent event strength, location (as geographic area-based, cell-based, event strength line based, or geographic or topographic coordinate based (as latitude and longitude)), and measured temporal occurrence, in particular to measurable impacts associated with the occurrence of flood, storm, hurricanes or tsunami events. Further, the invention is directed to automated parametric mitigation or transfer of the measured forward-looking impact to a specific object by an automated risk-transfer or risk-absorption system, where the impact e.g. is measured in units of expected damage rate, percentage or other quantifying and/or measuring units associated with the measured forward-looking impact the specific object. This invention further relates to automated methods and systems for automated location-dependent recognition of flood occurrence probabilities, strength and/or frequencies (often somewhat blurredly referred to as flood risks), where flood states are automatically measured or captured, and location-dependent forward-looking probability values are automatically determined, measured or generated based on the direct measuring link to the physical environment. Finally, the invention relates to digital, modular platforms for automated mitigation of impacted physical damages to physical objects on a certain geographic location and future time window.

BACKGROUND OF THE INVENTION

Flood, and in general disaster detection, has been one of the most active research areas in remote sensing today because saving human lives is one of the priorities once a disaster occurred. It is crucial in the coordination of fast response actions after a destructive disaster such as landslide and flood. Prior art systems have primarily concentrated on detecting changes occurred due to disaster, depending solely on in-situ sensors, and manually adjusted image processing techniques, such as band differencing and band rationing, post-classification comparison and object-based change detection method. To increase the accuracy of detection, some systems implement machine learning to improve the efficiency of extracting feature. Some prior art detection system use detection based on machine learning, e.g. hierarchical shape features in the bags-of-visual words setting to detect large-scale damage. Some of the cyclone track forecast systems use artificial neural networks, as e.g. multilayer feedforward neural networks, radial basis neural networks, and Random Forests in earthquake damage. Other damage detection system use 2D and 3D feature of the scene or execute deep learning method in geological disaster recognition.

However, still, prior disaster detection systems are mostly focusing on in-situ sensors, and they are unsophisticated. Therefore, they encounter several significant problems. For instance, the range for inspecting the occurrence of the disaster is limited due to the inadequate number of sensor and also the accuracy of information transmission is low due to verbally transmitted information. This is also true for satellite imagery-based systems. For those systems, the systems involved are also often unable to handle a massive amount of satellite imageries and detect disaster occurrence in short period of time. Consequently, this may lead to misinterpretation of information or overlook of occurrence of a disaster. Based on this example, it shows the fact that it is difficult to access immediate performance improvement on disaster detection and management based on prior art systems. Therefore, one technical objective is to build an automatic disaster detection system through inspecting the occurrence of a disaster in a broader range via satellite or aerial imagery and monitoring every single disaster, e.g. assisted by deep learning techniques as CNN or other machine-learning structures.

Reliable flood recognition systems are technically especially needed. Among the most impacting, damaging, and destructive natural or geophysical disaster of the world, floods are most frequent and uncertain type. Floods endangers lives, properties, infrastructures and damage a lot of livelihoods within a short period of time. FIG. 1 showing the physical impact of floods measured by monetary losses incurred in different countries. Controlling floods are difficult, but minimizing the impact by technical approaches is necessary. It is difficult to identify which measure is the better strategy and policy to deal with the floods. The combination of the human vulnerability and the physical exposures result in flood hazards. These losses and hazards can be minimized by making aware the public beforehand by providing them the reliable and suitable measuring data about flood risks, i.e. about the measurable probability value of having a certain impact strength to an object by an occurring flood event with a certain strength. Reliable prediction by technical forecast systems relying on measuring parameter values, preparedness, prevention, diminishing, and damage assessment are the stages of flood disaster management. Flood inundation maps are an important technical tool for providing the data in an accessible way. They reflect for different flood event types, the topographic forecasted pattern of a particular site, the sum of people and physical objects at risk, population anticipation and coping with the disaster and flood protection works. These are a crucial technical requirement for automated flood risk mitigation and risk-transfer rate pricing, municipal planning, ecological studies and set up of emergency action plans. Advancements in Remote Sensing (RS), technical modelling and forecasting and Geographic Information Systems (GIS) turned out to be important and particularly technically useful in flood inundation mapping. Floods can be predicted and flood risk areas can be identified via modelling with appropriately selected sensory input like hydrologic engineering centers-river analysis system (HEC-RAS) and hydrologic engineering centers-hydrologic modelling system (HEC-HMS) clubbing with GIS and Remote Sensing(RS). For example, for one-dimensional and unsteady-flow simulations of the designed floods, HEC-RAS and GIS can be used. Flood maps be generated for different return periods and these maps can be mapped to provide a comparison with other maps, e.g. using gradient or deviation measurements. This can be required for the technical prediction of floods.

Not all flood events have the same impact, wherein the impact may vary in strength as well as in type and time duration and topographic parameters e.g. influencing the flow strength and direction etc. In urban contexts, for example, flooding can e.g. pose a significant hazard to moving vehicles and causes traffic disruption by placing water flow in the transportation network, resulting in vehicles being swept away, injuries, and the loss of life of passengers. The remote detection of urban flooding over a large area will allow cities to develop flood maps to reduce risk during weather events. Mapping urban flood events is a challenge for three main reasons: the urban environment is highly complex with waterways at submeter resolutions, the flooding will be shallow and ephemeral, and ponding means that the flooding extent will be discontinuous. Hydrologic models that are the conventional approach in flood forecasting struggle with these factors, making the application of these techniques difficult. Attempts have been made in the prior art to map urban flooding and flood risk with traditional prior art methods. However, high resolution hydrologic modelling structures may be effective at small scales (e.g., a few urban blocks) but the computational resources and highly accurate inputs required to properly model urban flooding at the community scale are not widely available with the current technology. These limiting factors exemplify the need to find technically based methods of mapping or predicting flooding that are less computationally intensive. The advantage of remote sensing is flood detection for large scale flood mapping without the need for highly accurate inputs and computationally intense processes to advance flood risk management.

While extreme flooding, especially that which falls in the 100-year event category, is quite understood, and mapped by a plurality of prior art systems, minor flooding is difficult to map and predict. This less severe flooding, known as nuisance flooding or NF, poses less of a hazard to lives and property, but can still be inconvenient or even dangerous, especially to drivers. Though drier regions such as Southern California may not experience the same extreme, spatially extensive flooding common in other more humid parts, NF remains a problem during the rainy season, especially for aging infrastructure or current systems that are not designed to handle changing climactic patterns. NF is expected to become more of a problem in the future as the climate changes and sea levels rise. Coastal areas such as Southern California are particularly vulnerable to NF. There is a need to develop new reliable techniques to detect catastrophic flooding, also covering urban flooding, which may be also used for nuisance flooding, reducing the risks associated with flooding during heavy rainfall in various context, covering urban and rural environments.

In the technical field of remote sensing, systems have been developed in flood detection using optical methods such as aerial photographs or satellite imagery, such as SAR and LiDAR (Light Detection and Ranging) systems. SAR, or Synthetic Aperture Radar, is an especially promising technique. As an active sensor, the radar can detect the Earth's surface no matter what time of day it is or what cloud conditions prevail. Some prior art systems for the detection of flooding with SAR try to combine SAR imagery measurements from COSMO-SkyMed (Agency Spaziale Italiana, Rome, Italy) and Landsat 8 OLI data (Ball Aerospace and technologies, Boulder, CO, USA) to measure map flooding along rivers. Others rely on measured RADARSAT-2 SAR images and flood stage data based on the return period for the 2011 Richelieu River flood in Canada, and even others rely on using TerraSAR-X in tandem with very high-resolution aerial imagery to measure map floodings. Until now, SAR data was considered insufficient for mapping flooding in more complex topographies and zones as urban zones due to the low resolution and shadow and layover in the complex urban environment.

The technical need for reliable and fast measuring and/or forecasting systems is also reflected by the painfully lacking reliable automated flood impact and impact response or mitigation systems. For many countries, it is hardly possible to do a technically correct flood impact occurrence rating and/or determination based on predictive forward-looking impact measures. A glance at the loss history shows that physical damages and associated losses caused by flood events are equally high or higher than those of other natural catastrophic events as earthquakes, windstorms, or other perils. For many of those other perils various prediction and/or rating and/or early warning systems based on actual measuring parameter values already exist. Large physical part of industrial facilities, industrial power and time are lost by occurring flood events having a physical impact to such objects. Additionally, with the trend of increasing risk-transfer penetration for floods, the insurance and re-insurance industry is affected ever more by flood caused physical damages and losses. To extend the early warning and flood damage rating to detailed and even facultative business, however, the threat of immense data amounts has to be coped with. This is done by completely new simulation approaches simulating allowing to extrapolate actual physical measuring parameters to future, i.e. forward-looking time windows and geographic cells.

Further, in many countries, a large number of industrial facilities and homes have a significant and measurably predictable probability (risk) for being impacted by flood events, and reasonably should be covered by flood mitigation and risk-transfer processes. However, many prior art systems are not capable to reliably hedge against the technically difficult to predict perils of flood events, inter alia, due to the prevalence of moral hazard and adverse selection phenomena, for example, in entering risk-transfers for objects most affected by the specific peril of flood. In such cases, traditional risk-transfer is not available. Whereas for other damage risks, risk-transfer systems can be based on the use of the law of large numbers to precisely determine a relatively small premium amount to large numbers of objects in order to cover the occurring damages of the small numbers of impacted objects who have suffered a loss due to the event-based impact to their objects. In flood event covers, typically the number of impacted objects is larger than the available number of individuals interested in protecting their property/objects from the peril using risk covers, which means that most prior art insurance systems do not provide risk-transfers to occurring flood events since the probability of operating the system in a sound profit range are regarded as being remote. Additionally, while there are risk-transfer systems that are enabled to provide primary flood risk covers for high value homes, the underwriting and provision of such mitigation processes does not account for many flood risks.

The lack of flood reliably automatable risk mitigation, risk-transfer and risk covering systems can be detrimental to the operation of many industrial facilities at a certain location or detrimental to local homeowners of the geographic cell concerned. Even, in many cases, the responsible may discover only after an occurring event impacting a damage that their standard damage covers, and risk-transfers do not cover damages caused by flooding. It is to be mentioned that flooding can occur due to or in the wake of various physical natural disasters, for example occurring earthquakes, landslides, tsunamis, volcanic eruptions, hurricanes, cyclones, storm surges, glacial melting, or other natural disasters. Furthermore, few risk-transfer systems provide flood damage coverage due to the hazard of flood typically being confined to a few areas. As a result, it is an unacceptable risk due to the inability to spread the risk to a wide enough group of objects in order to technically absorb the potential catastrophic nature of the hazard.

In summary, natural disasters such as floods cause severe damage in various parts of the world. The occurrence of most of such disaster events is difficult, if not impossible, to predict over the long term by prior art measuring systems. Conventional flood mitigation techniques determine, assess, and estimate pricing of flood risks using parametric risk-transfer structures so as to mitigate flood risks by gathering information related to base flood elevation data, flood depth by using mitigation devices and survey information. In addition, digital marketplace techniques list online policies that guarantee a pre-agreed payout based on pre-determined parameters in case of a flood hazard. The digital marketplace techniques determine a water-elevation function factoring in high water probability data, leading to saving both risk-transfer providers' and customers' time and cost spent on building, inspection, and damage estimation. Additional mechanisms for assessing flood risks use measured flood levels through detection chambers that assess floods based on a determined flood level measured by air-based pressure measuring devices and/or remote sensing techniques, as e.g. satellite based determination of floods. Further, the measured flood levels are used to automate signaling and triggering of cover for a physical impact, typically measured as loss or damage at the impacted object, for example by a flood damage cover payout.

Other available risk transfer mechanisms capture event data of occurred flood and maps data to a digital map along with data related to risk transfer of portfolio. The portfolio is mapped by geographic area and value so that an exposure and risk to the portfolio induced by a flood event is determined. Yet another mechanism for assessing flood risks by simulating movement of water in case of floods is to determine potential for water damage to surface of a structure. This mechanism provides automated expert advices relating to whether to apply flood risk-transfer/insurance for risk-exposed structure based on simulation of water movement in relation to the structure.

Parametric insurance/cover is a type of risk-transfer that is provided to the individual based on one or more pre-agreed measure (the measuring or triggering "parameter" or "index"). The parametric risk cover is levelled by an adjustable degree or threshold value of a predicted risk measure based on, for example, geographic location, exposure threshold etc. Such values can e.g. be generated using prior art hazard mapping applications such as CatNet. The exemplary, proprietary hazard mapping application CatNet is a global, web-based natural hazard analysis and mapping software-based engine, which enables the user to assess and visualize natural hazard exposure for a certain location in the world. Such prior art data-processing engines, as data-link to the application, typically comprise Application Programming Interface (API) providing access to the proprietary risk modeling structures (as e.g. Cat Server API) or any probabilistic flood modeling techniques.

Based on the degree of risk accessed, a parametric expertise may be determined to tailor a product design. This may involve introducing index definition including double trigger functionalities, quoting, and pricing, combining parametric and indemnity risk-transfer. Further, parametric transfer structures may be determined using natural catastrophe (NatCaT) pricing tool for parametric damage and damage exposure cover. In addition, based on the inventive parametric structure, a modular computer-supported platform can be provided that provides an end-to-end solution from automated to front-end and underwriting to automated natural catastrophe impact covering, e.g. by automated electronic monetary transfer. The platform may be used as front-end for users, for event tracking, for automated activation or electronic triggering of electronic alarm devices e.g. based on forecasted event progressing, measured and/or forecasted event impact and/or physical damage parameters, maintaining proof of loss, generating automatic claims payment, and sustaining policy administration.

The above-disclosed mechanisms/techniques do not discuss about providing a modular system that determines, assesses, and evaluates price risks that arise due to occurrence of floods. In addition, these mechanisms/techniques fail to provide parametric risk transfer structures that facilitate to mitigate the risks associated with occurrence of the floods. There is therefore a need in the art for an improved, automatable system and method for providing a customizable impact cover structure for a flood area risk based on measurable and reliable prediction and assessment of location- and time-window-dependent physical impact damage during the occurrence of flood events.

SUMMARY OF THE INVENTION

It is one object of the present invention to provide an automated system and method for reliable forward-looking measurements and ratings of physical impacts of occurring location-dependent catastrophic events, as flood events, to a specific object, and in automated conduct and provision/generation of appropriate covers and/or hedging against the impacted damage to the specific object. It is further an object of this invention to provide a new and better automated system and method for providing a dynamic parametric cover, which does not have the above-mentioned disadvantages of the prior art. In particular, it is an object of the present invention to provide a risk-transfer cover based on an extend of a flooded area. Further it is an object, to generate a pricing based on the chosen limit (payout cover) as well as exposure (flooded area) of the insured. The extent of flooded area is generated by assessing an Area of Interest (AOI) using automated systems such as Synthetic Aperture Radar or Drones and by dividing the area into equally spaced measuring points. In ideal case, the system should be automated to disperse payments. The payments are dispersed via an electronic payment transfer module based on the generated parametric coverage monetary pay-out parameter. In particular, it is an object of the present invention to provide an automated method and system for providing dynamic parametric cover to an individual in case of an occurrence of a flood event by using an adaptive risk-transfer structure based on physical flood event measurements.

According to the invention, the above-mentioned objects related to airborne and/or spaceborne optical flood sensory systems and methods for measuring and/or forecasting a weightage-specific, quantitative flooding measure value and/or a weightage-specific, quantified flooding impact extent measure value, the weightage being based on an object density of a selected topographic and/or geographic area impacted by an occurrence of a flood event, are achieved, particularly, (i) by measuring, by means of aerial and/or space-based remote sensing devices, digital imagery sensory data and transmitting said imagery sensory data via a data transmission link to a central ground station, (ii) by capturing, by a predefined data structure of a flood map generator, a geographic and/or topographic area to be covered, the data structure at least comprising definable area parameters capturing geographic location and/or geographic extent of said geographic and/or topographic area, and generating, by the flood map generator, a flood map based on the transmitted digital imagery sensory data using the predefined data structure, (iii) by splitting the geographic area to be covered by a spatial grid with equidistant grid cells of definable size, (iv) by detecting and aggregating, for each grid cell or group of grid cells of the spatial grid, definable physical objects located in a specific grid cell or group of grid cells and generating for each grid cell or group of grid cells an object density-based weightage value, and applying a normalized weight to each of the grid cells by dividing the weight per grid cell with the sum of weights for all the grid cells of the grid, (v) by measuring, after an occurrence of a flood event, an affected area of said geographic area based on measuring a flooding within the grid cells of the spatial grid, wherein grid cells measured as flooded are contributing to the measured affected area while grid cells measured as not flooded are not contributing to the measured affected area, and (vi) measuring a summed up value of the normalized weights for all the affected grid cells, and measuring the flooding extent measure value and/or flooding impact extent measure value of the affected area based on a pre-defined trigger and said summed up value of normalized weights.

This has, inter alia, the advantage that an automated cover transfer, e.g. an appropriately adapted payout and/or electronic payment transfer signaling is based on measurable parameters, i.e. the optical measured extend of flooded area and the corresponding weightage for each grid cell. The inventive system allows to user-specific parametrization and setting of a total area to be covered (Area of Interest—AOI). This area to be covered is split, in particular dynamically split based on the geographically and/or topographically and/or land-cover-induced required resolution (urban and/or rural and/or highly jointed and/or high/low density of situated objects etc.) into a spatial grid with an adaptable size of spatial grid cells, for example, of ~500 m×500n (0.005×0.005 deg). This technical structure allows to assign a weightage factor for each grid cell (or group of grid cells). The weightage can be based on the exposure of one or a set of objects to be covered, population density, building stock and/or kind of buildings etc. This can be predefined and/or dynamically captured or adapted by object recognition of the optical sensory data. The inventive application of normalized weight to each of the grid cells (dividing the weight per cell with the sum of weights for all the grids) allow to aggregate the different impact strength of each grid cell to a target total, i.e. to measurably parameterize the total impact strength based on the optical measuring values. A threshold trigger to automatically identify affected grid cells after a flood event, can be set to be measured as totally flooded, or a definable percentage by the threshold trigger, providing a large adaptability and flexibility of the technical approach, which cannot be provided by the know prior art systems. Further, by generating the sum of the normalized weights for all the affected grid cells, the cover, e.g. the payout transfer, can be based on an adaptable or pre-defined trigger operation or function and the measurable captured sum of weights. The present invention also allows to set priorities, for example, for the areas, which are having more exposure either by the number of physical objects located therein, or by the geographic characteristics influencing the measured exposure value, or both of them. In this embodiment variant, area of lower interest can e.g. be given weightage of 0 and thus excluded from calculations. Finally, the technical structure of the inventive system also allows to be customized user- or client-specifically based on different types of weights related e.g. to population density, operative exposure, type of industrial or agriculture exposure etc. It is to be mentioned, that since the inventive system allows to add weights to each cell allows to improve the technical ability of the system to reflect the actual riskiness of the underlying set of objects to be covered. It is clear that depending on the size of the grid and the AOI, the present inventive system can end to comprise a lot of grid cells to be measured. Lower grid cells will be better in capturing variation of flood; however this can be computationally in respect to the required processing power challenging.

In an embodiment variant, the method further comprises (i) providing a dynamic parametric flood impact cover for an object physically impacted by the occurrence of the flood event by using an adaptive risk-transfer structure based on the flooding extent measure value and/or the flooding impact extent measure value, (ii) generating the parametric coverage covering a possible loss associated with the occurrence of the flood event and impacting the geographic area measured by the affected area, as per the adjustable risk-transfer structure a threshold measure and is triggered by a threshold-trigger, wherein the threshold-trigger is selected from a percentage of the affected area given by the measured affected area to the geographic area; and (iii) transferring, by an electronic payment transfer module, based on the generated parametric coverage monetary pay-out parameter values by electronic payment transfer to the individual.

The grid cells can e.g. be measured as flooded when each grid cell of a specified area is flooded. The grid cells can e.g. be regularly spaced within the spatial grid with a predefinable spacing. The grid cells can further e.g. be essentially 0.005×0.005 deg grid cells. The grid cells can be defined as grid cells of two dimensional m×n blocks. The m×n blocks are of approx. 8.72 radian. The network points measured as flooded can e.g. be determined using at least a neural network approach, and the affected area is measured using airborne and/spaceborne imaging devices comprising optical sensing devices of unmanned or manned aircrafts, drones, zeppelins, satellites and/or spacecrafts.

In another embodiment of the invention, wherein a premium is calculated based on the selected payout coverage. Further, the geographic area is of unvarying landscape representative of area covered by dry land and wetland. Further, the occurrence of the flood event is detected using loopback signaling.

BRIEF DESCRIPTION OF THE DRAWINGS

According to the present invention, these objects are achieved particularly through the features of the independent claims. Additional features and advantages will become apparent to those skilled in the art upon consideration of the following detailed description of illustrative embodiments exemplifying the best mode of carrying out the method as presently perceived.

The present disclosure will be described hereafter with reference to the attached drawings, which are given as non-limiting examples only, in which:

FIG. 4 shows diagrams, schematically illustrating the present inventive system allowing to add weights to each cell of the spatial grid which improves the ability to measurably capture and reflect the actual riskiness of the underlying set of physical objects to be covered by the system located in the selected area. Depending on the size of the grid and the AOI this can end to be a large number of grid cells. Lower grid cell sizes will typically be better in capturing variation of flood, i.e. improve measure resolution, however this can be critical in respect to the required computational processing power.

FIG. 11 shows relevant parameters of the Lidar-systems to be considered by the system 1.

DETAILED DESCRIPTION

Figure 1:
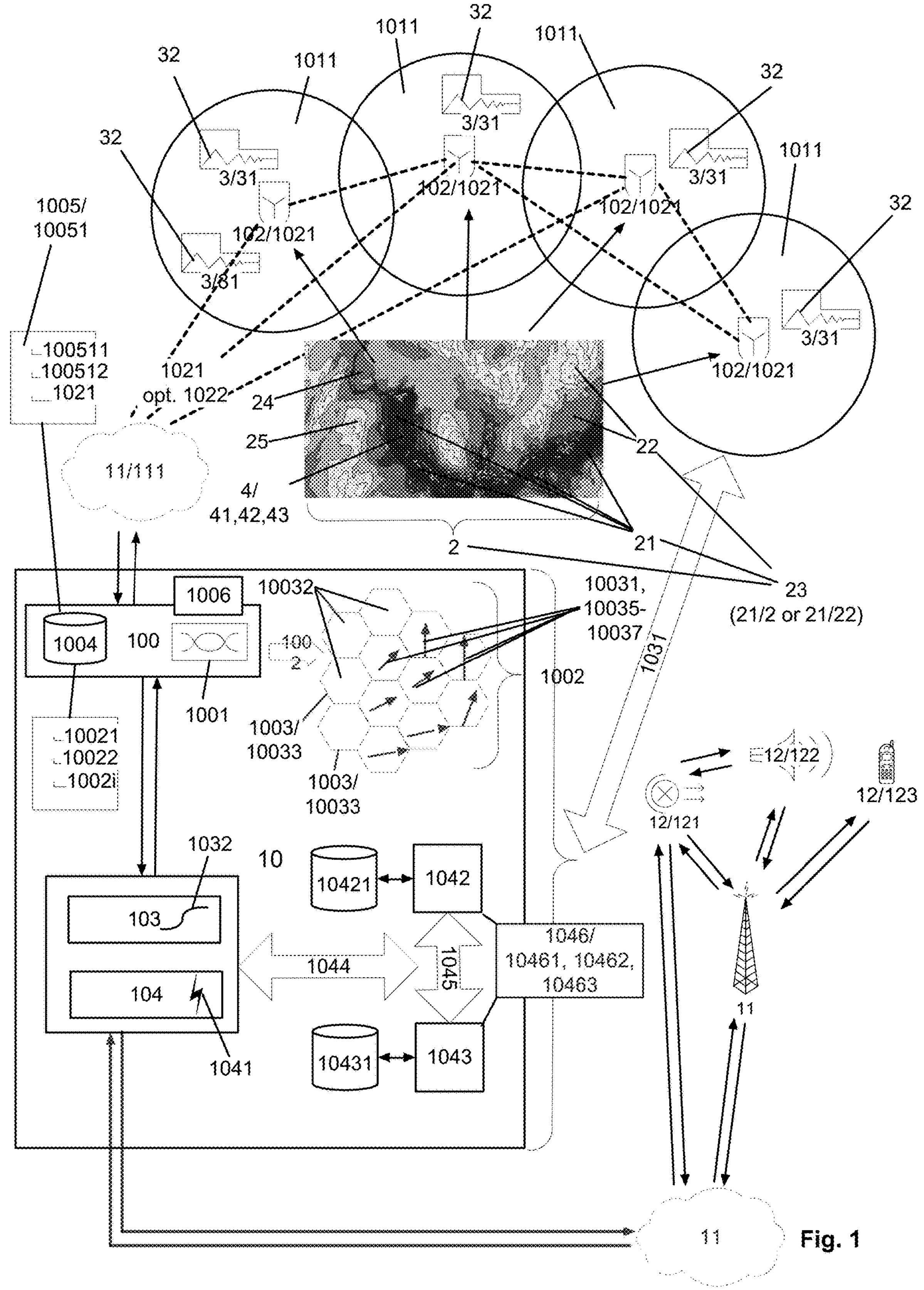
FIG. 1 is a block diagram illustrating exemplary an architecture of the inventive airborne and/or spaceborne optical flood sensory 1 and method for measuring and/or forecasting a weightage-specific, quantitative flooding measure value and/or a weightage-specific, quantified flooding impact measure value, the weightage 10035 being based on an object density of a selected topographic and/or geographic area impacted by an occurrence of a flood event 4.

FIG. 1 shows a schematic overview of the present invention, which illustrates an overall operation of an embodiment of an automated airborne and/or spaceborne optical flood sensory system 1 and method providing a dynamic parametric flood impact cover for an object physically impacted by the flood and/or to an individual assigned to the impacted object. An automated system 1, is disclosed for providing a dynamic parametric flood impact cover to a flood exposed physical object 3/31 or an individual assigned to said object 3/31 in case of an occurrence of a flood event. The dynamic parametric cover is provided by using an adaptive risk-transfer structure based on physical flood event measurements.

The airborne and/or spaceborne optical flood sensory system 1 and method measure and/or forecasted a weightage-specific, quantitative flooding measure value and/or a weightage-specific, quantified flooding impact measure value, the weightage 10035 being based on an object density of a selected topographic and/or geographic area 2 impacted by an occurrence of a flood event 4. The method comprises the steps of (A) measuring, by means of aerial and/or space-based remote sensing devices 102, digital imagery sensory data 1021 and transmitting said imagery sensory data 1021 via a data transmission link to a central ground station 10, (B) capturing, by a predefined data structure 1005 of a flood map generator 1000, a geographic and/or topographic area 2 to be covered, the data structure 1005 at least comprising definable area parameters 10051 capturing geographic location 100511 and/or geographic extent 100512 of said geographic and/or topographic area 2, and generating, by the flood map generator 100, a flood map 1007 based on the transmitted digital imagery sensory data 1021 using the predefined data structure 1005, (C) splitting, by the central measuring engine 10, the geographic area 2 to be covered by a spatial grid 1002 with equidistant or adjusted grid cells 1003 of definable or adjustably determined size 10033, (D) detecting and aggregating, for each grid cell 1003 or group of grid cells 1003 of the spatial grid 1002, definable physical objects 3/31 located in a specific grid cell 1003 or group of grid cells 1003 and generating for each grid cell 1003 or group of grid cells 1003 an object density-based weightage value 10036, and applying a normalized weight 10037 to each of the grid cells 1003 by dividing the weight 10035 per grid cell 1003 with the sum of weights for all the grid cells 1003 of the grid 1002, (E) measuring, after an occurrence of a flood event 4, an affected area 21 of said geographic area 2 based on measuring a flooding within the grid cells 1003 of the spatial grid 1002, wherein grid cells 1003 measured as flooded are contributing to the measured affected area 21 while grid cells measured as not flooded are contributing to the area 22 measured as not affected, (F) measuring a summed up value of the normalized weights 10037 for all the affected grid cells 1003, and measuring the flooding extent measure 44 and/or flooding impact measure value 45 of the affected area 21 based on a pre-defined trigger and said summed up value of normalized weights.

The physical flood event measurements of the airborne and/or spaceborne optical flood sensory system 1 and method measures and/or forecasts a weightage-specific, quantitative flooding measure value and/or a weightage-specific, quantified flooding impact extent measure value, the weightage being based on an object density of a selected topographic and/or geographic area impacted by an occurrence of a flood event. The measurements are done by means of aerial and/or space-based remote sensing devices of the system 1 measuring digital imagery sensory data and transmitting said imagery sensory data via a data transmission link to a central ground station. A flood map generator is used to capture by a predefined data structure a geographic and/or topographic area to be covered. The data structure at least comprises definable area parameters capturing geographic location and/or geographic extent of said geographic and/or topographic area, and to generate a flood map based on the transmitted digital imagery sensory data using the predefined data structure. The geographic area is split by the system 1 to be covered by a spatial grid with equidistant grid cells of definable size In one embodiment, at reference number 52, a trigger with applicable trigger function is generated by a trigger module and the trigger is activated upon occurrence of the flood event. The trigger may provide information corresponding to such as flood extent, flood depth. To measure the weightage-specific, quantitative flooding measure value and/or the weightage-specific, quantified flooding impact extent measure value, the system 1 detects and aggregates, for each grid cell or group of grid cells of the spatial grid, definable physical objects located in a specific grid cell or group of grid cells and generates for each grid cell or group of grid cells an object density-based weightage value. Further, the system 1 applies a normalized weight to each of the grid cells by dividing the weight per grid cell with the sum of weights for all the grid cells of the grid, After a detected and/or measured occurrence of a flood event, the system measures an affected area of said geographic area based on measuring a flooding within the grid cells of the spatial grid, wherein grid cells measured as flooded are contributing to the measured affected area while grid cells measured as not flooded are not contributing to the measured affected area. Finally, the system 1 measures a summed up value of the normalized weights for all the affected grid cells and measuring the flooding extent measure value and/or flooding impact extent measure value of the affected area based on a pre-defined trigger and said summed up value of normalized weights.

Figure 2:
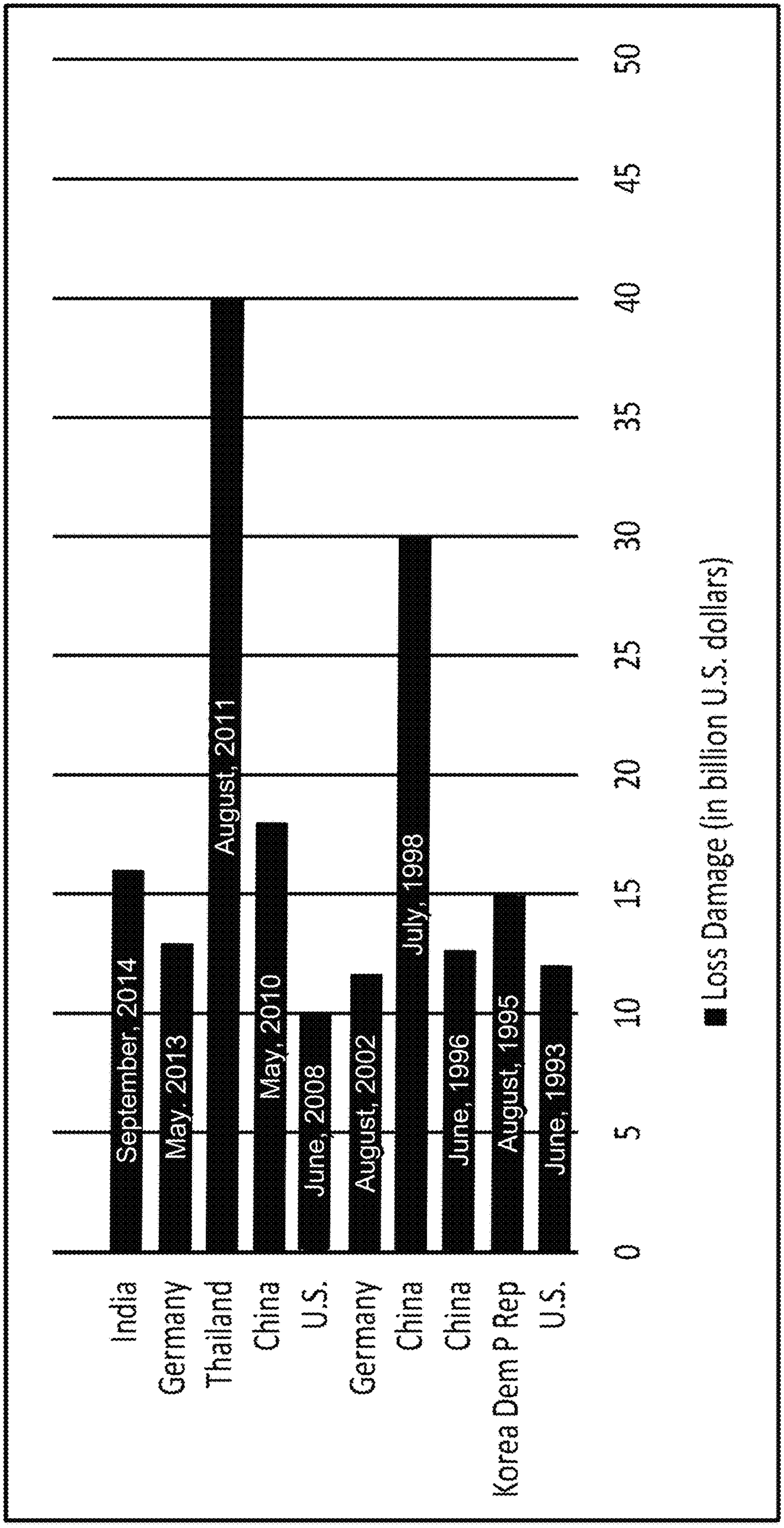
FIG. 2 shows diagrams, schematically illustrating the physical impact of floods measured by monetary losses incurred in different countries, where the physical impact and damage of top floods is represented in terms of monetary losses (source:www.worldatlas.com).

At reference number 3, a payout function is activated and generates a payout to be paid to the insured (at reference number 56) and triggers the payout calculation function (at reference number 54). The payout generated is dependent on occurrence of the flood event, regardless of actual loss incurred in the flooding event. The payout function is explained in detail in conjunction with FIG. 2 of the present application.

Further, in another embodiment, an independent third party or a reporting agent, at reference number 55) determines an intensity of the flood event and thus determines an impact (proof of loss) on the claim raised by the insured (at reference number 56). The independent third party/reporting agent provides the information to the insurer (at reference number 57) to initiate Payout calculation and triggering payout (at reference number 54) and also informs to the insured (at reference number 56). In another embodiment, an automated software may also be used to calculate the payout, and automatically intimate the insured and initiate the payment.

The insured (at reference number 56) is the one who may request a maximum payout cover from the insurer (at reference number 57). The maximum payout cover is based on extend of the flooded area. The premium (at reference number 58) is paid to the insurer (at reference number 57) depends on the chosen limit as well as exposure of the insured (at reference number 56). In one embodiment, the premium is generated using probabilistic modelling structures and indemnity costing, upon numerous reviews.

Figure 3:
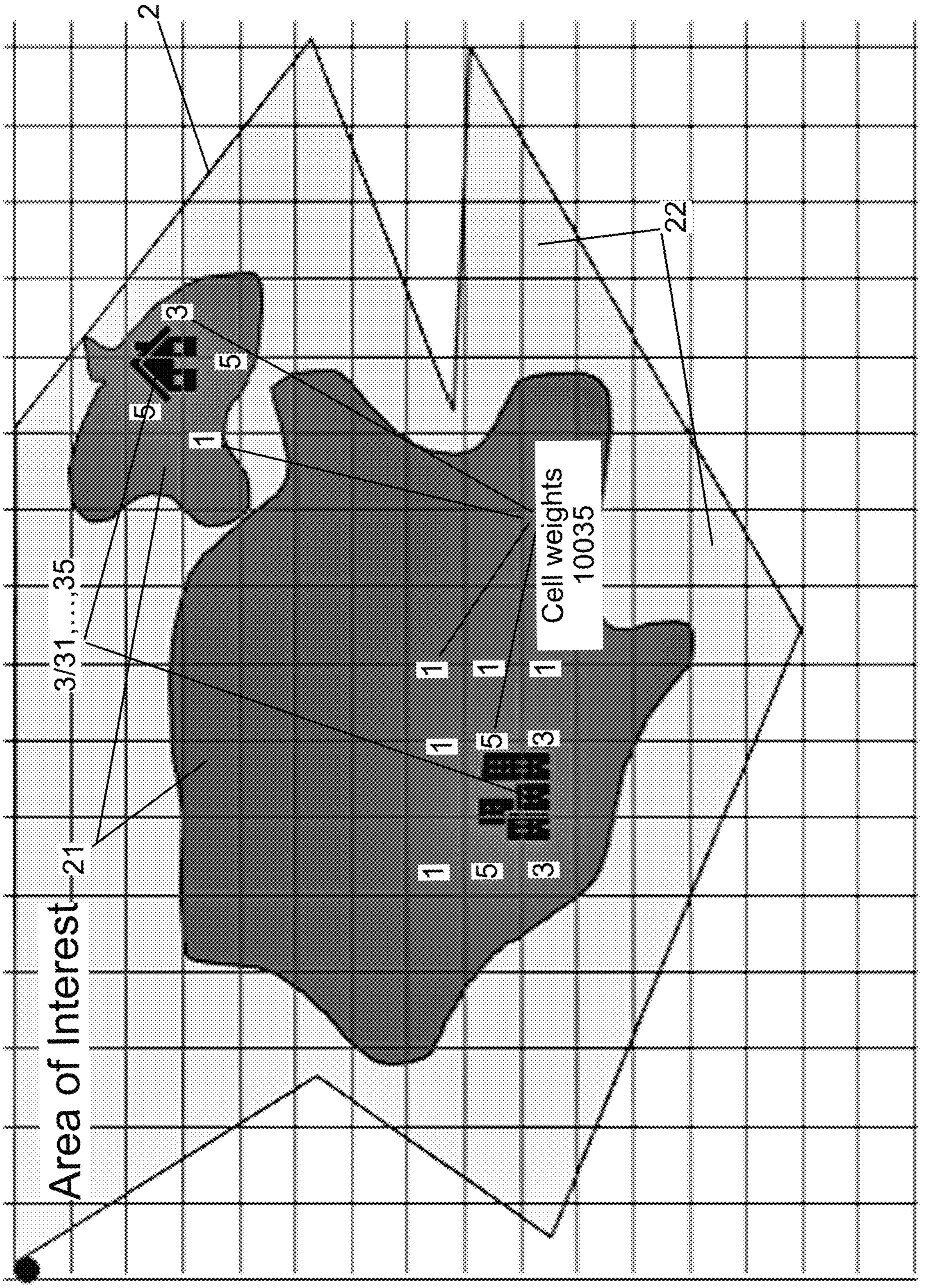
FIG. 3 shows diagrams, schematically illustrating a structure scheme presenting an impact of flood event.
Figure 5:
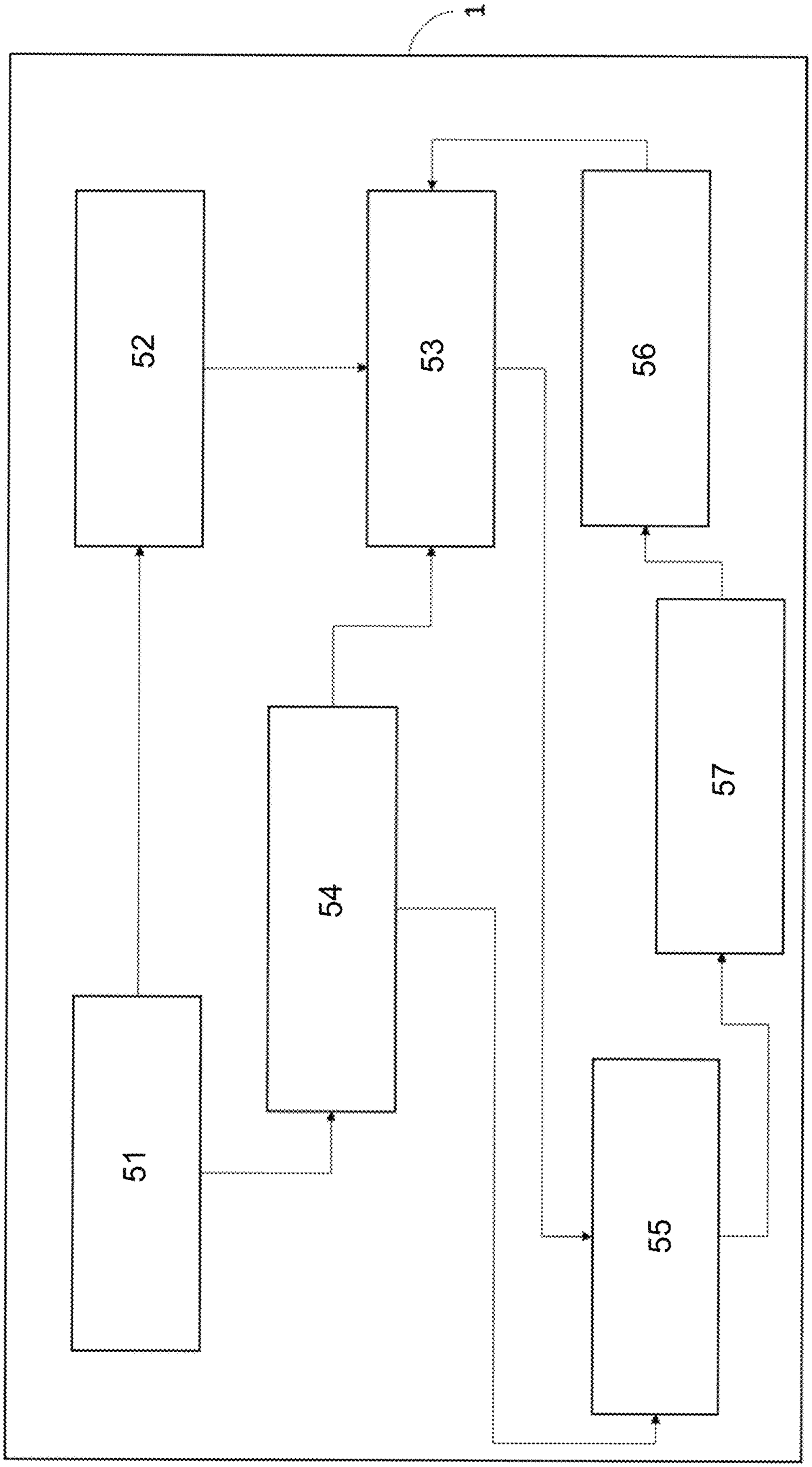
FIG. 5 shows diagrams, schematically illustrating a cover scheme used during occurrence of flood event in relation to topography and exposure distribution. It further illustrates the overall operation of one embodiment of the method of the present invention.

As is shown in FIGS. 3 and 4, is a diagram depicting a structure scheme presenting an impact of the flood event in a specific region. The trigger data may be obtained from highly reputed independent third party agency that are mutually in agreement with the individual. The third party agency may be, for example, use on-air imaging device such as Synthetic Aperture Radar (SAR) satellite imagery and drone based imagery that provide multiple images to capture flood depth and flood extend.

In one embodiment, the automated system (at reference number 1) first measures an Area of Interest (AOI). The AOI is an extended flooded area of a total area cover of the region. The calculated AOI is then divided into a plurality of grid cells (at reference number 9) of a spatial grid. The grid cells defining the desired resolution, may be determined randomly or dynamically, for example, the grid cells can e.g. be regularly spaced within the spatial grid with a predefinable or dynamically adapted and captured spacing. The grid cells can e.g. be essentially 0.005×0.005 deg grid cells. In a variant, the grid cells may be defined as two-dimensional m×n blocks such as 500 m×500n (0.005×0.005 deg.) blocks of approx. 8.72*10-5 radian. Upon occurrence of the flood event, an affected area (AA) is determined, by generating the number of grid cells that are totally or partially flooded. In the embodiment variant of the partial flooding, the flooding can be detected by measuring a flooded percentage or height in regard to a pre-definable trigger threshold.

Figure 18:
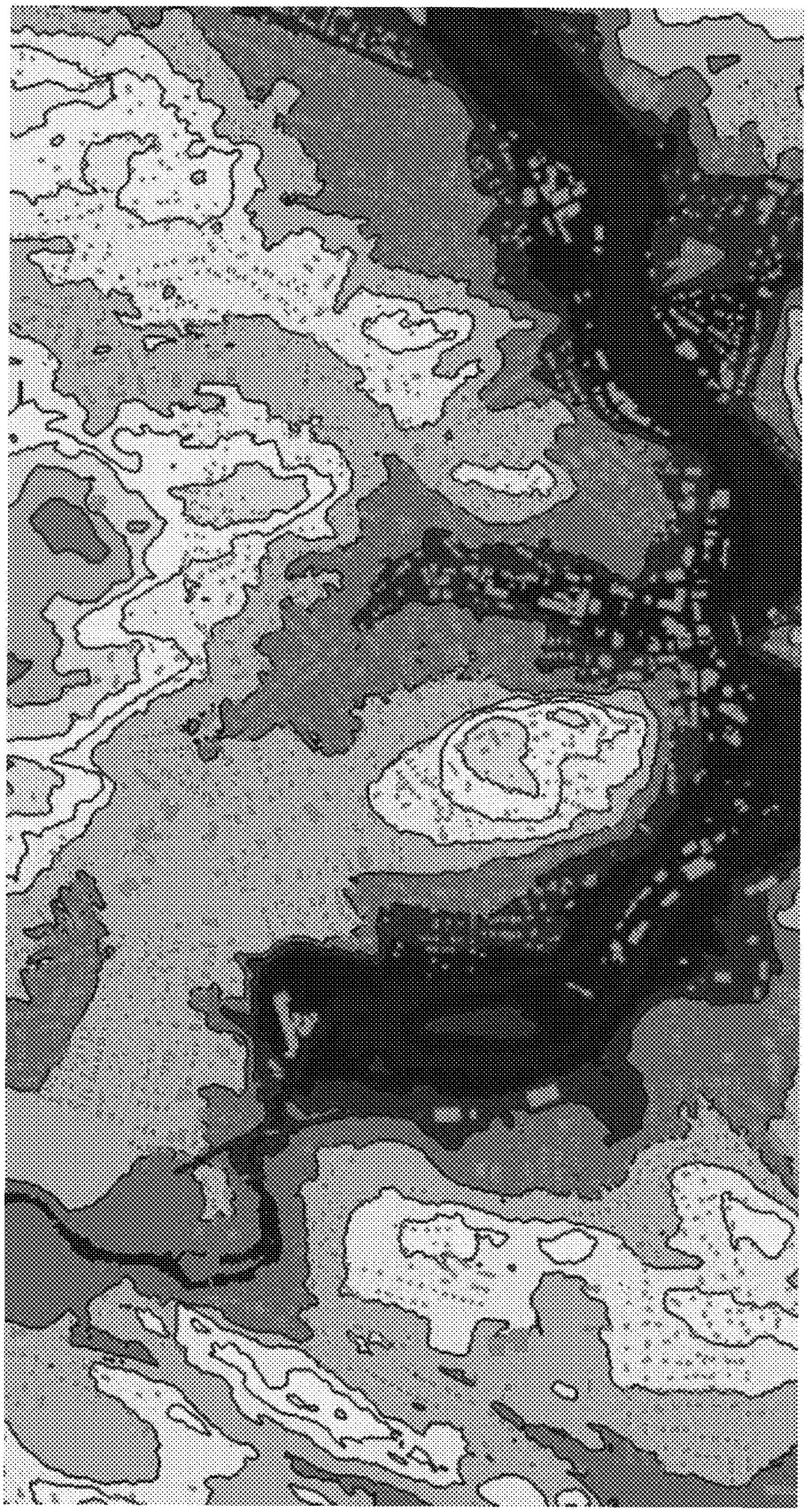
FIG. 18 schematically illustrates an exemplary flood map or digital elevation map from satellite imagery classification. Physical objects 3, as e.g. buildings or other constructions, can e.g. be automatically located using LiDAR which, inter alia, allows the system 1 to detect how close a physical object 3 lies or within which flood zones.
Figure 19:
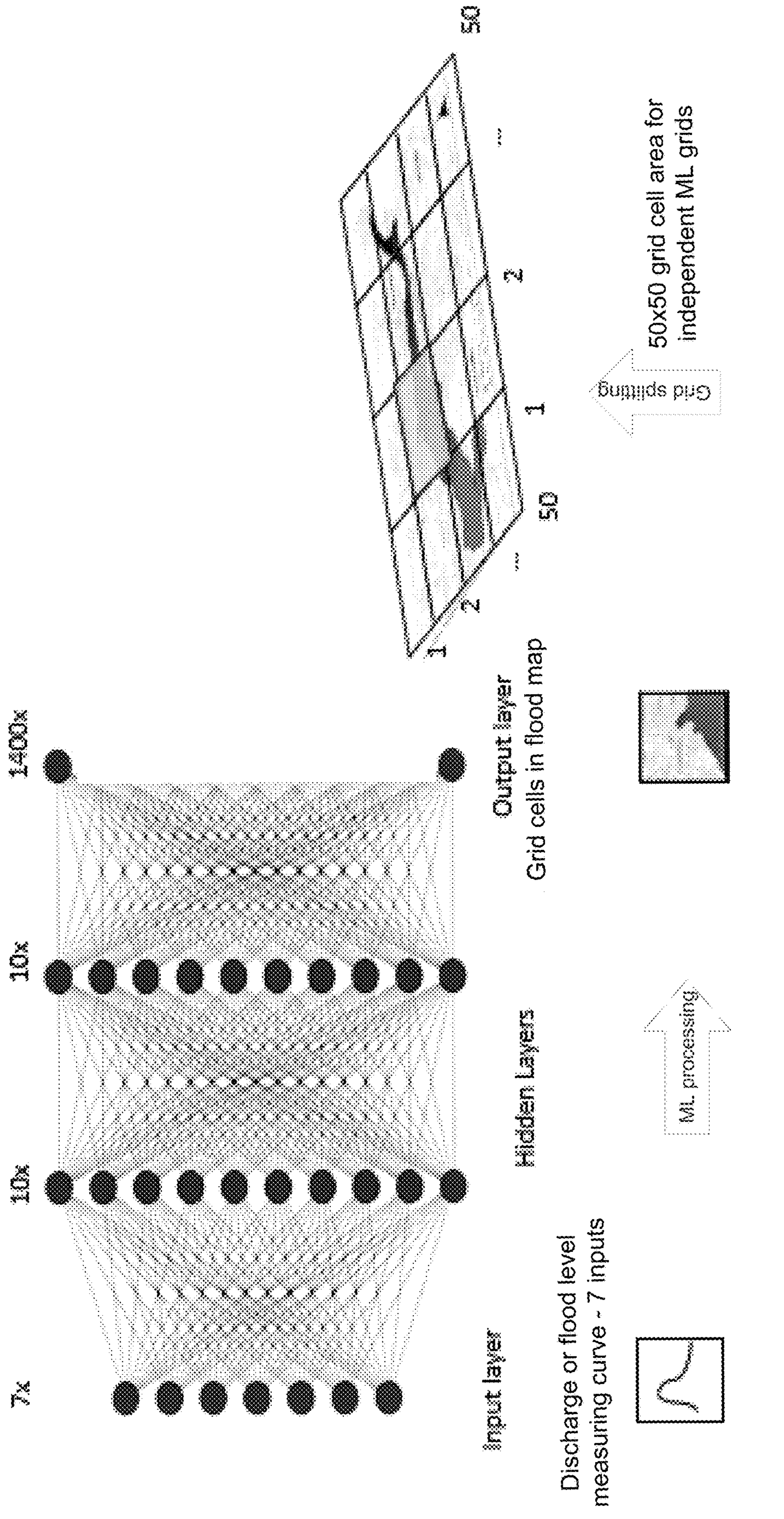
FIG. 19 shows schematically a machine-learning setup. The geographic area 2 is divided in 50×50 grid cell 1003 raster each simulated by its own machine-learning structure. Input layer: seven input hydrographs. Output layer: flood inundation extent in each grid 1002 and/or grid cell 1003.
Figure 20:
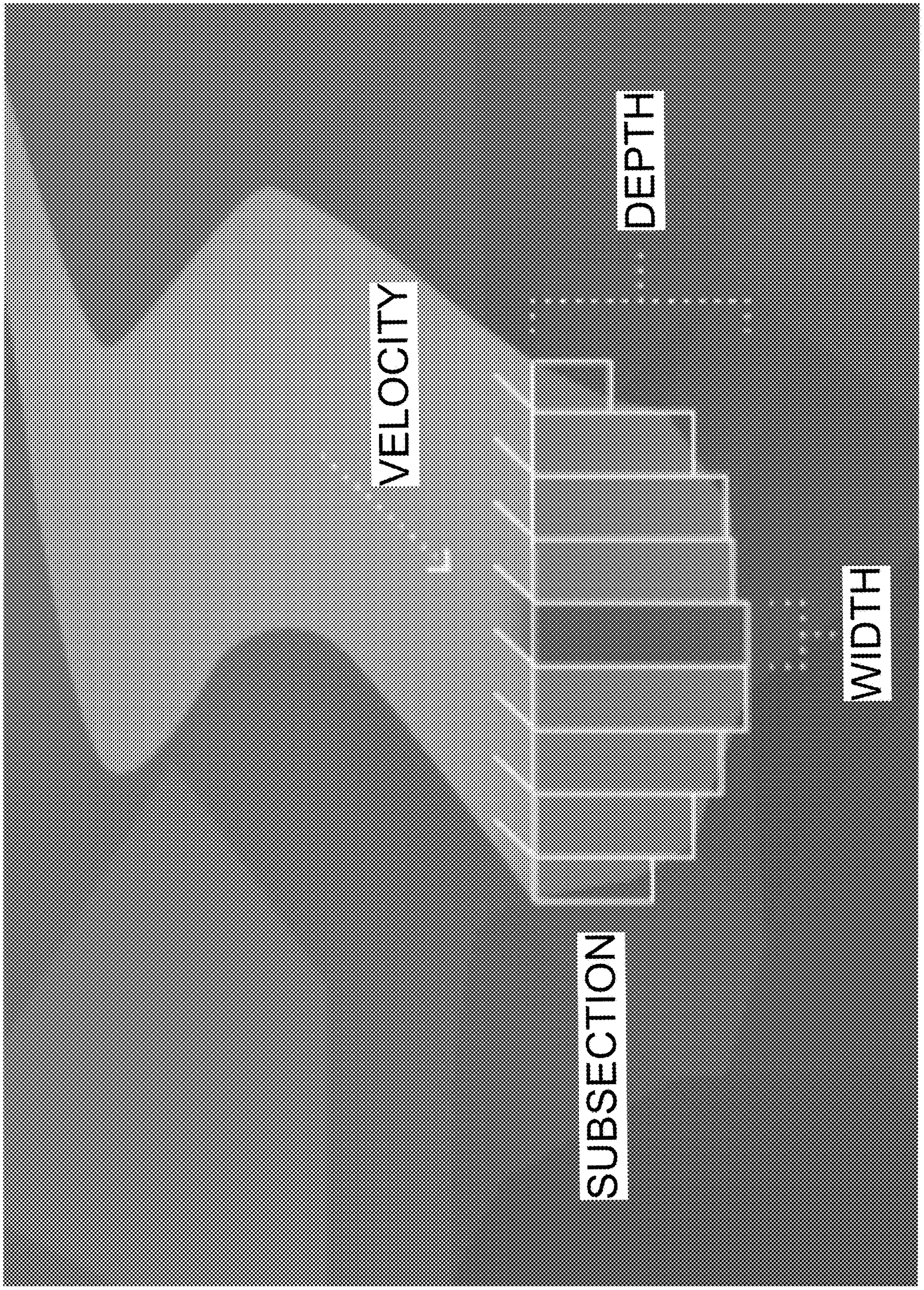
FIG. 20 shows schematically grid cells 1003 based stream-flow measurements which can e.g. be an important measuring parameter that also impacts many other aspects as e.g. the river's hydrology and water quality.
Figure 21:
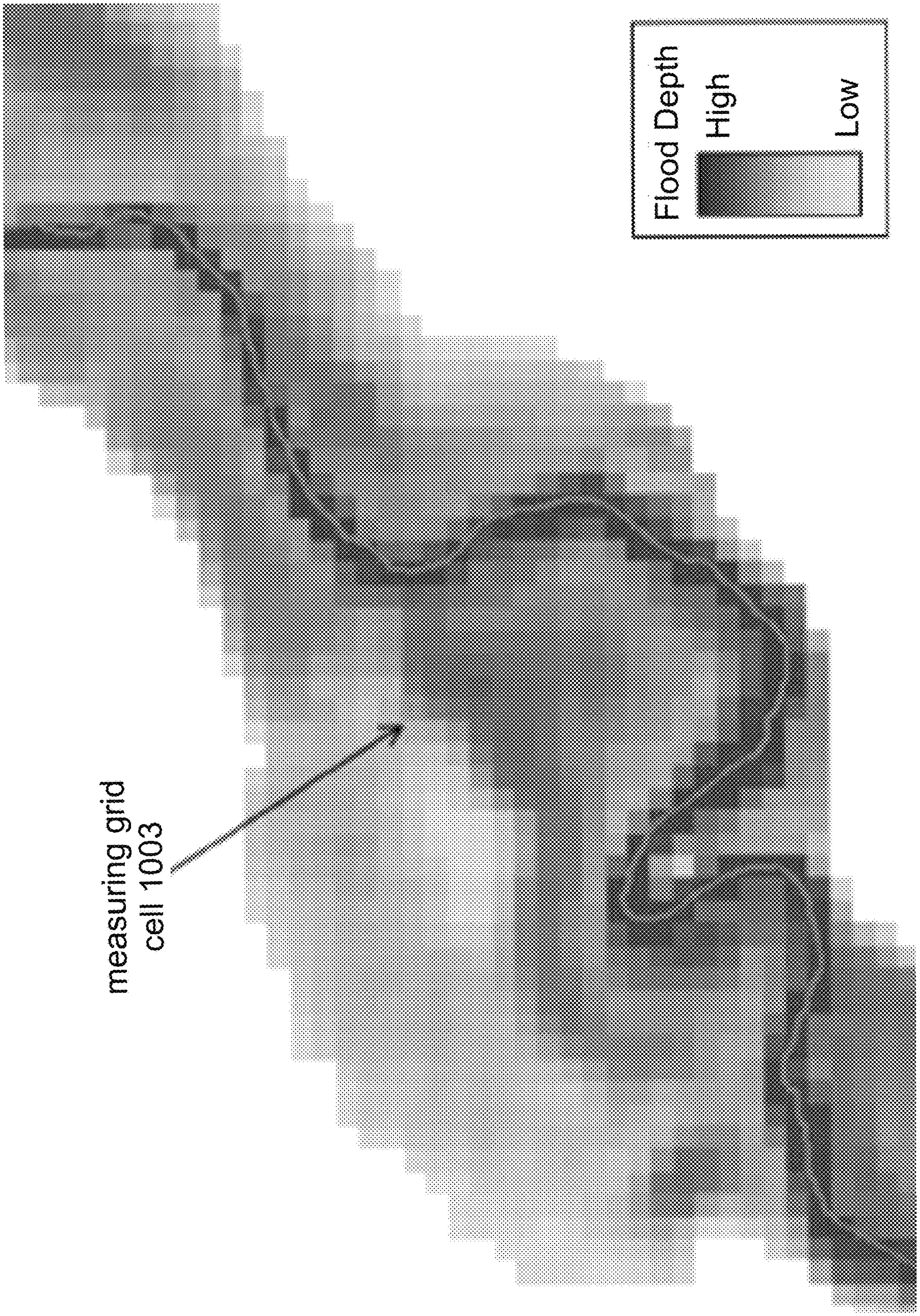
FIG. 21 shows schematically an exemplary flood grid 1002 measuring flood depth, where the darker areas represent greater flood depths
Figure 22:
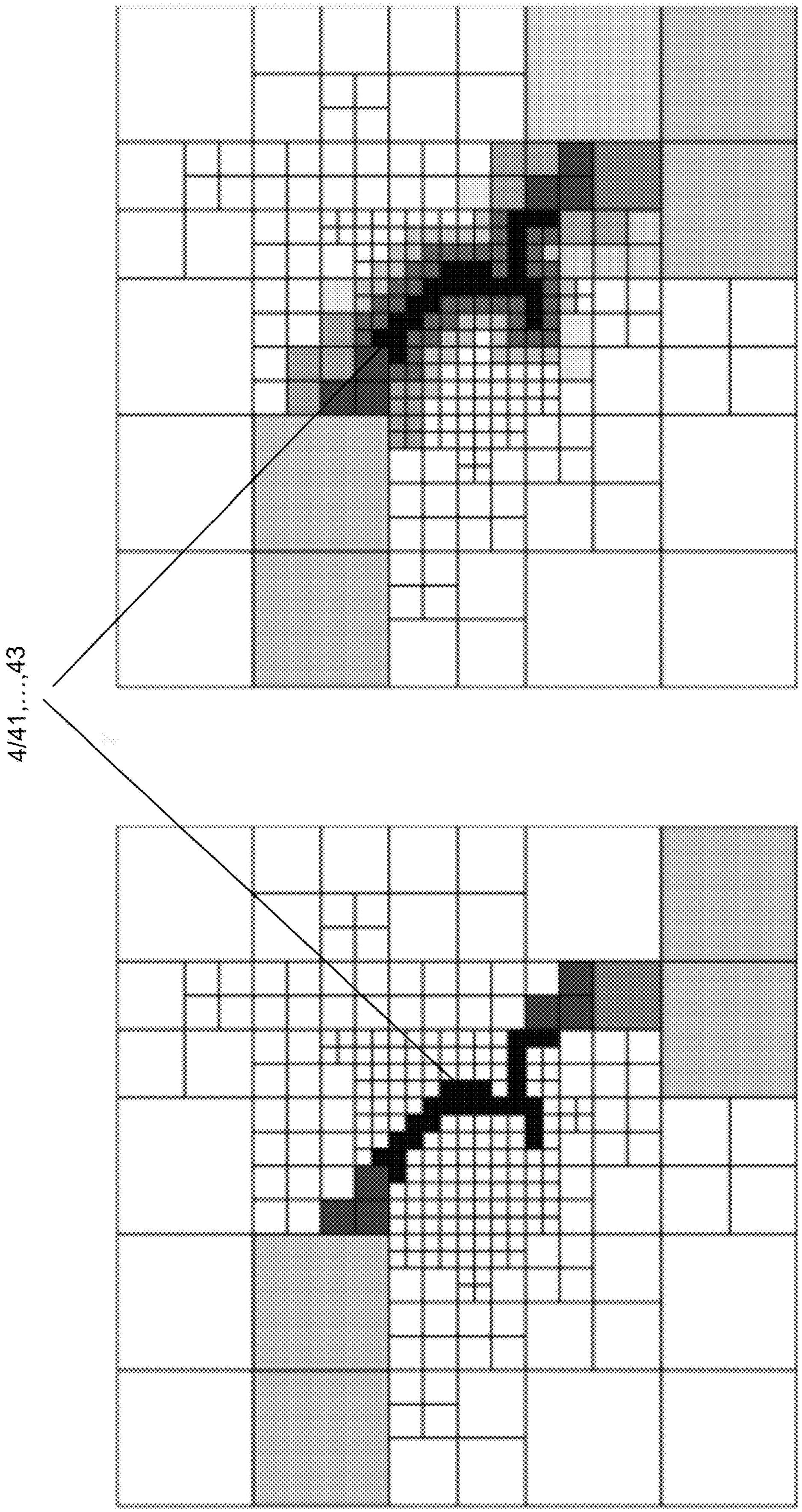
FIG. 22 shows schematically exemplary dynamically adjusted grid cells 1003, wherein the cells 1003 are chosen to be dynamically adapted by the system 1, where areas closer to the flooding and/or river etc. are applied with a high measuring resolution than areas further away. This allows a more precise measurement of flooded areas 21 than achieved by the prior art systems.
Figure 23:
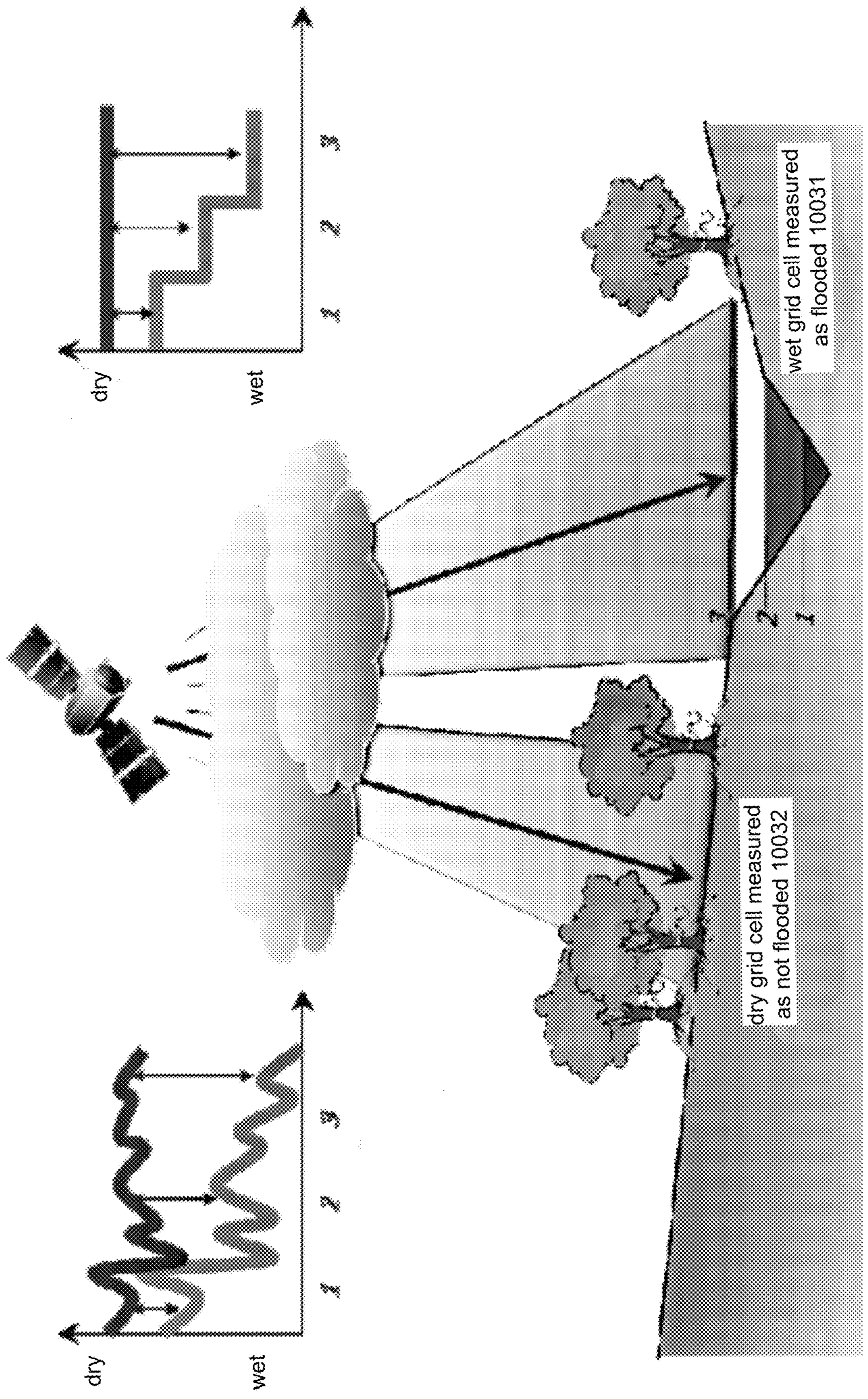
FIG. 23 shows schematically exemplary measurements of the geographic area 2 by satellite measurements detecting flooded grid cells 1003 and not flooded grid cells 1003. The influence of clouds is eliminated by comparing and/or calibrating dry and wet measuring signals (left diagram). Water has a lower brightness temperature measured than land (right diagram).
Figure 24:
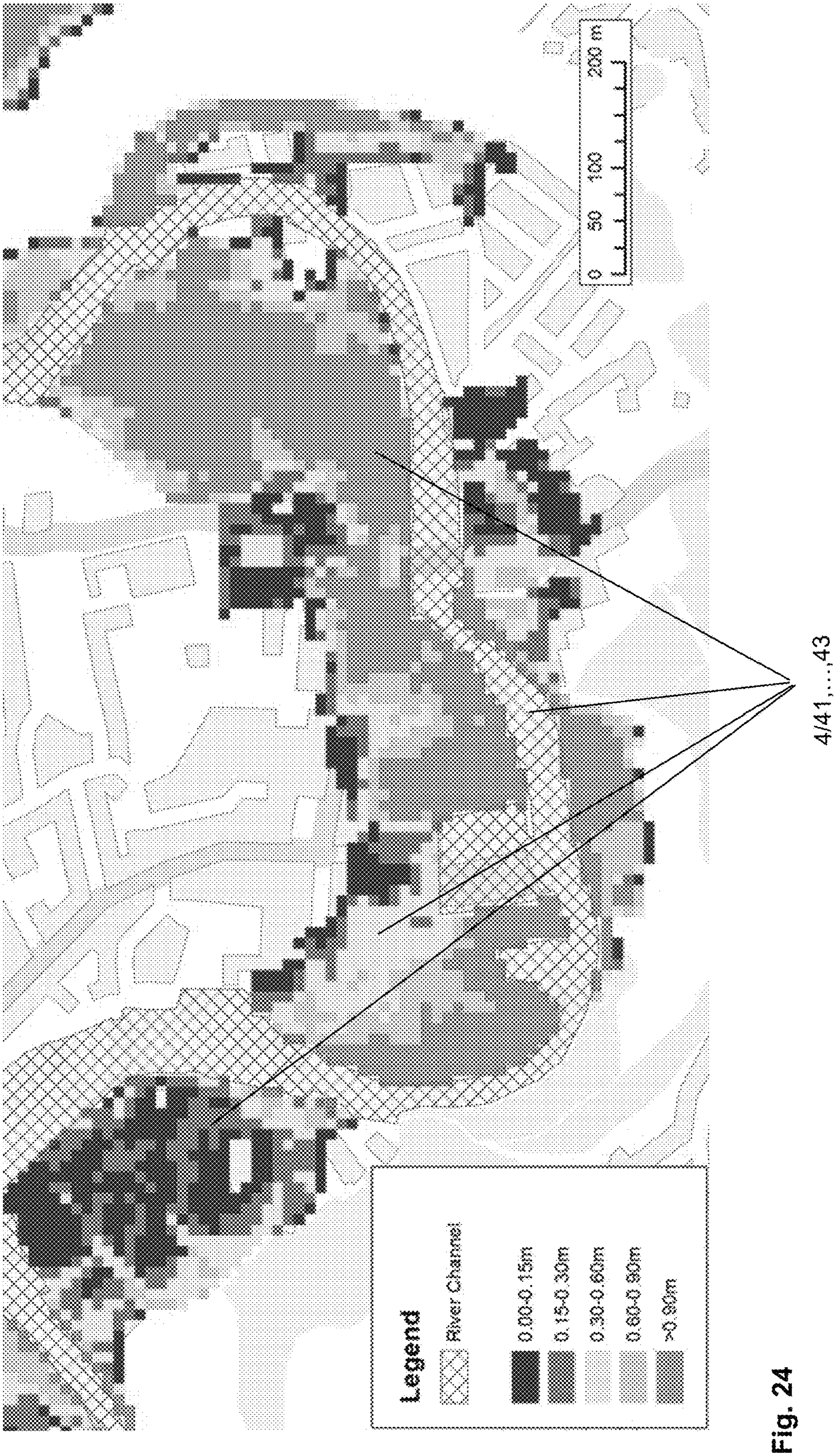
FIG. 24 shows schematically exemplary measurements a flood event 4/41,42,43 in a geographic area 2 based on grid cell measurements.

In one embodiment variant, for the grid cell resolution, it should e.g. be taken into account when selecting the cell size 10033 for the grids 1002, that the depth and measuring grid cells 1003 have an inherent relationship to the underlying topographic data used during the development of the flood hazard delineations, which can e.g. be depicted on the flood risk rate map. The raster cell size (resolution) 10033 of all raster datasets measured should be based on the density of the ground elevation data used and the appropriate precision that can be supported by the measurements. Normally, all the gird measuring datasets can e.g. use the same grid cell size 10033. However, the cell size 10033 for the grids 1002 can e.g. be no larger than 3×3 m. This will allow for a more accurate depiction and retrieval of the measuring values from that grid dataset. In the present system 1, a two dimensional horizontal modeling structure can e.g. be applied to get the detailed and accurate map of water levels and/or flood patterns and/or potential flood exposed areas. Instead of equal sized grid cells 1003, also structured curvilinear grids 1002 can e.g. be used for the hydraulic forecast processing, where the curvilinear grid cells 1003 provide a precise forecast output signaling by allowing cell stretching along river main channels while orthogonality stays within reasonable bounds. However, the use of curvilinear grid cells can e.g. result in a high resolution in sharp inner bends since grid lines are focused on the bends. A technically not required high resolution can strongly increase computational and processing time. In a preferred embodiment variant, the measuring grid cells 1003 are chosen to be dynamically adapted by the system 1 (see FIG. 18), where areas closer to the flooding show a high resolution than areas further away. This allows a more precise measurement of flooded areas 21 than achieved by the prior art systems.

The flood measuring and trigger system 1 comprises flood detection devices and/or flood sensors 102 for measuring an occurrence of a flood event 4 by measuring floodings within grid cells 1003 of the spatial grid 1002, wherein flood measuring parameters 1021 of the flood detection devices and/or flood sensors 102 are transmitted to the central measuring engine 10 and wherein, based on the transmitted flood measuring parameters 1021, grid cells 1003 measured as flooded are contributing to the area 21 measured as affected while grid cells measured as not flooded are not contributing to the area 22 measured as affected. The geographic area 2 can e.g. comprise surveyed landscape representative of area covered by dry land 24 and wetland 25. The geographic area 2 can e.g. comprise at least parts definable as automatically excluded from the dynamic parametric flood impact cover 1031. The occurrence of the flood event 4 can e.g. be detected using loopback signaling 1022 for the signaling of the flood detection devices and/or flood sensors 102. The herein proposed technical loopback mechanism is especially shaped for the flood detection providing an inventive loopback flood detection method and system. A source maintenance end point at the flood area sends a loopback message to the target maintenance point at the central measuring engine, wherein the loopback message comprises a flow identity corresponding to one specific transmission path in a plurality of equal transmission paths to the target maintenance point. After receiving the loopback message, the target maintenance point sends a loopback replay message to the source maintenance end point, wherein the loopback replay message comprises a flow identity corresponding to a reverse common transmission path to the source maintenance end point. After receiving the loopback replay message and detecting to be correct, the source maintenance end point returns an announce of successful loopback detection. According to the inventive loopback detection method, the working mechanism of prior art loopback detection is expanded, and loopback detection can be performed on one specific path in a plurality of equal paths, thus allowing and providing high-speed transmission and detection of occurring flood by flood measurements in real-time or quasi-real-time.

According to the invention, the above-mentioned objects related to an space-borne sensory satellite and/or airborne sensory and drone-based flood measuring system and method for precise measuring of flood elevations and/or precise forecasting of quantitative flooding elevation measure values and/or flood impact measures on objects within a selected topographic and/or geographic area impacted by an occurrence of a flood event, are achieved particularly by (i) capturing available location data comprising aerial and/or spaceborne optical measuring data and/or surveying measurement data for the selected area, (ii) by measuring, by means of satellite-based and/or drone-based remote sensing devices, digital imagery sensory data and transmitting said imagery sensory data via a data transmission link to a central ground station, (iii) leveraging selectively and directedly the captured location data by the satellite and/or drone sensory measurements to leveraged measuring data and generate location-dependent elevation measurands based on the leveraged measuring data, and (iv) capturing, by a predefined data structure of a flood map generator, a geographic and/or topographic area to be covered, the data structure at least comprising definable area parameters capturing geographic location and/or geographic extent of said geographic and/or topographic area, and generating, by the flood map generator, a flood map with the measured elevation measurements based on the transmitted drone sensory data and the leveraged measuring data using the predefined data structure.

This has, inter alia, the advantage that the inventive system allows for a quasi-real-time flood assessment and satellite-sensory and/or drone-sensory based precise measurement. The measuring system can be realized as a web GIS digital platform allowing users to navigate areas of interest and assess flood risks with the respect to return periods, rainfall data and inundation heights. In addition, the measuring system can e.g. act as an expert system providing precise measurements for loss prevention recommendations. Further, the measuring system is able to provide precise "what if scenario simulations and forecasts", e.g. by using machine-learning-based forward looking structures. The input parameters of the machine-learning-based forward looking structure can e.g. be varied to detect and identify areas where additional drone-based sensory measurements, e.g. regarding spatial resolution of the measuring data and/or precision of the elevation measurements etc., increase the measuring precision of the system. Such areas for additional drone-based sensory measurements can also be identified by user-specific selection, where in the measuring system refines and augments the measuring precision of the drone-based measurements upon request and selection. By the present measuring system, the user can e.g. be enabled to draw a structure whit a given height and is enabled to specifically simulate dedicated measuring and/or forecasting results and/or specified parts of the measurements, e.g. in respect to location, extend of the area, precision of the elevation measurements etc. In particular, the user is enabled to specifically simulate results to see how much inundation can be protected using definable and adaptable embankments height.

For example, an embodiment variant can e.g. comprise two stages (e.g. offline and online stages) based on the drone-based elevation measurements. The system is initialized in the first stage by collecting the required airborne and/or spaceborne captured imagery. These imagery represent different flood levels as well as imagery without any flood in the areas of interest. Due to the scarcity of the imagery in unusual situations like flood disasters, the collected imagery can e.g. be preprocessed by a data augmentation module to synthetically generate new images enabling the efficient application of deep learning techniques. Then, the system can e.g. build an object detection modelling structure, for example, using R-CNN by retraining the network on the available imagery. This modelling structure is responsible for classifying and segmenting objects in the airborne and/or spaceborne captured images, including e.g. buildings and cars. Based on the information obtained from each optical imagery, the system can e.g. use an object processing module to decide whether to consider or filter out the objects within the imagery. After that, the system can e.g. build and train a water level estimation model for identifying the water level from the objects detected in each image. During the second phase, the imagery captured by aerial and/or space-based optical sensing device can e.g. be forwarded to the object detection model, which is trained in the offline stage, for identifying and locating objects in the scene. These objects are fed to the water level estimation to measurably estimate the water level in the cell or area based on the optical sensed measuring values.

Figure 16:
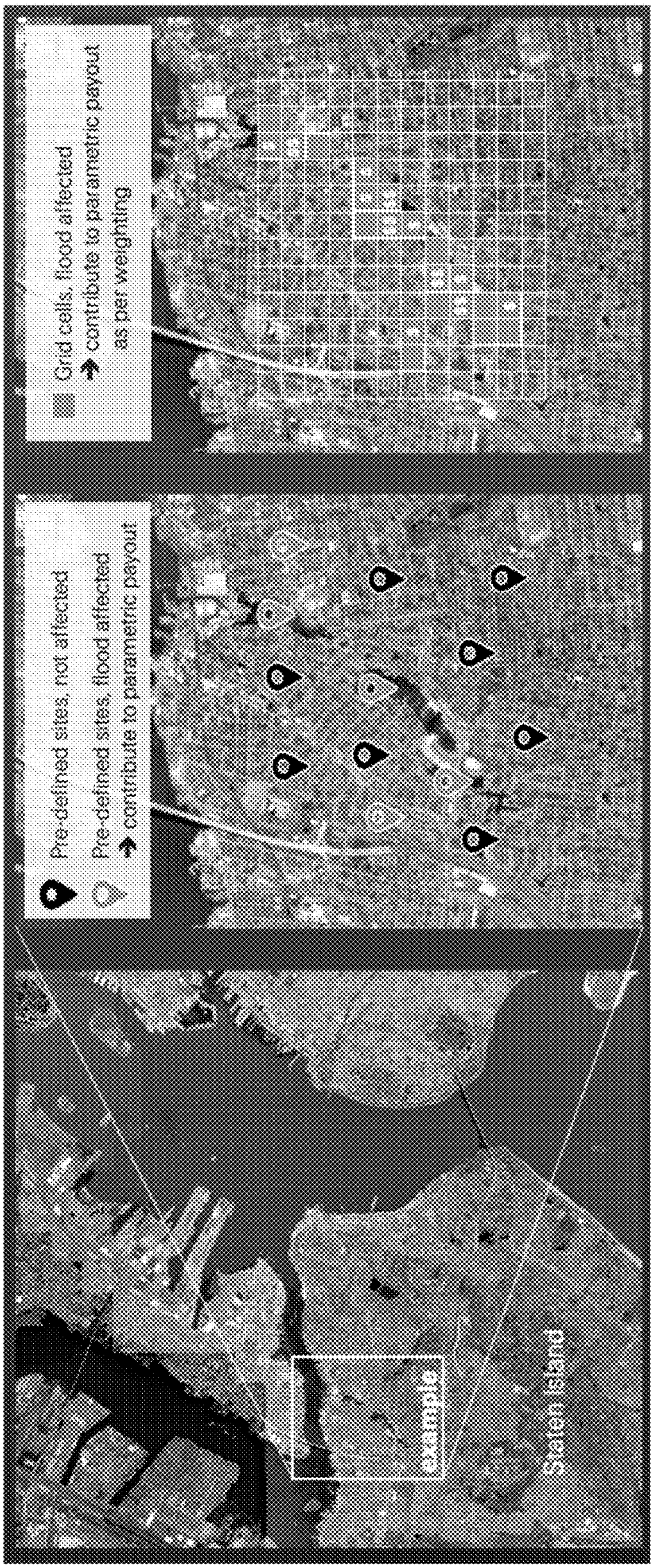
FIG. 16 schematically illustrates an exemplary parametric flood risk-transfer structure triggered by the inventive flood measuring footprints based on maximum flood extent.
Figure 17:
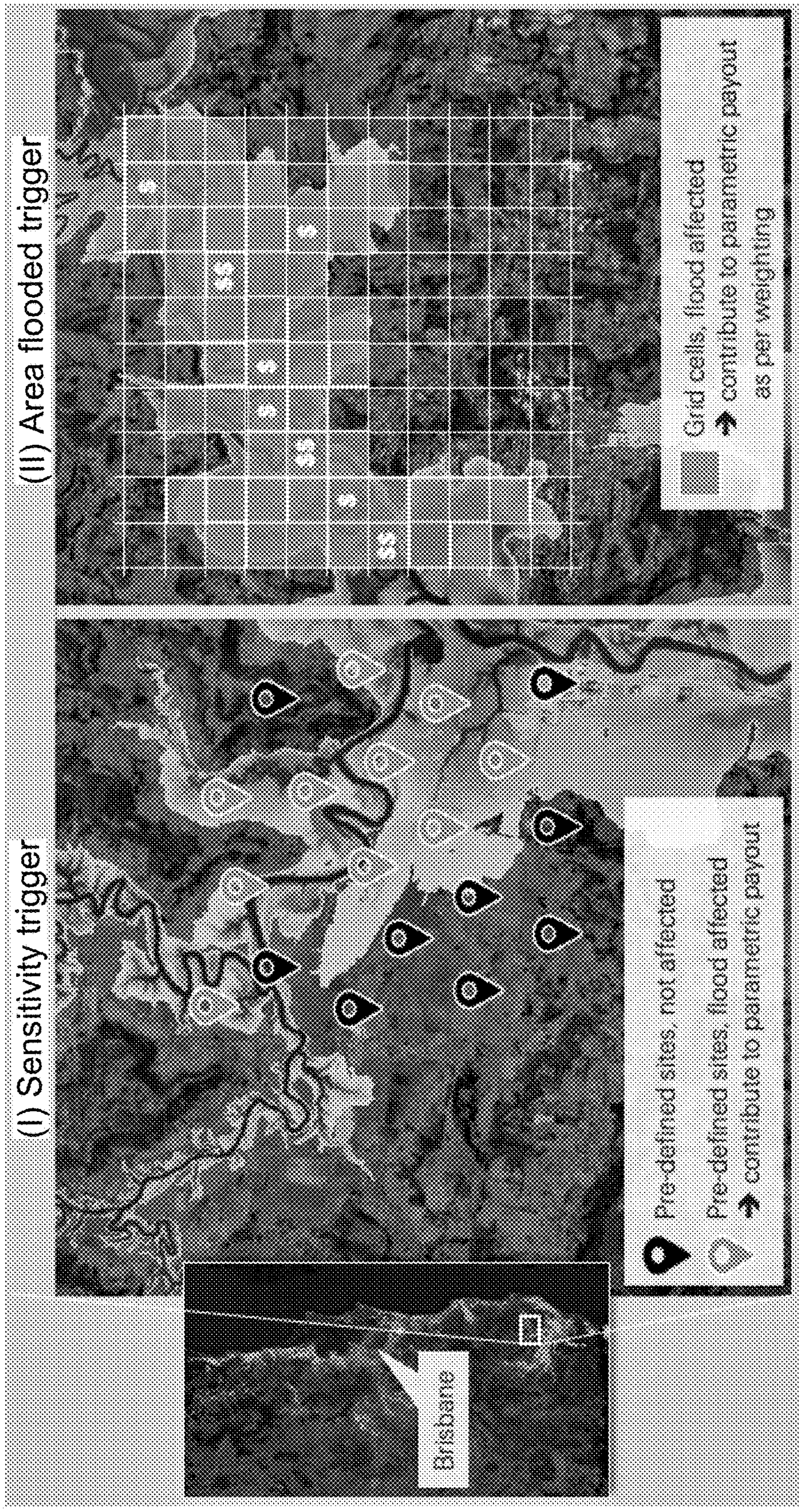
FIG. 17 schematically illustrates an exemplary identification of critical sites or objects 3 and generating a grid over a geographic area 2 of interest at which a flood is measured. A flood extent mapping is provided by the system 1 within 24 hours after peak flood. The system 1 automatically detects if pre-determined sites were flooded. Cover with defined payout amounts for all affected sites and/or objects 3 can e.g. be provided within 30 days, thereby optimizing financial resilience and enable an immediate response.

It is to be noted that the present inventive measuring system 1 can e.g. in an embodiment variant also be used as flood warning system 1. Monitoring is important: While some areas are more exposed to flooding than others, situating measuring devices and flood sensors 102 near waterway or body of water can provide additional critical and precises in-loco measuring data. This additional measuring data can e.g. be used to calibrate the measuring data extracted from the air-borne or space-borne sensory measurements. The affected area 21 can e.g. be measured using gages and telemetry equipment 1025. The present inventive system 1 is based on the regular measuring of local rainfall, stream level, and streamflow data in each grid cell 1003. This can be real-time monitoring with telemetry allowing for the fastest possible response to a flood event. It is clear that a real-time flood warning system 12/121, . . . , 123 can reduce risks involved with flooding. The affected area 21 can e.g. be measured using at least partially air-based and/or space-based optical measuring devices 1023/1024 using digital image recognition processing (see FIG. 16). The present system 1 forecasts floods using the below described model structures for forecasting how rivers and streams respond to varying levels of measured rainfall and snowmelt. These forecast processing are based on already measured data records of flood level and/or stream stage and/or discharge, the generation for which are outlined below.

There are a broad variety of automated stream gages that can transmit stream level data via telemetry. Gages developed according to the NWS ALERT protocol are among the most common. However, it's to be noted that many other gages designed to measure precipitation and water level operate under similar principles, and this guide may be applicable to certain aspects of other systems. The gages, used herein, perform two primary tasks: sensing and communicating. The gages, as used herein, employs sensors to detect changes to measuring parameters, e.g. precipitation volume and/or water level. As an embodiment variant, the used gages may also be equipped with temperature and wind speed sensors. Some gages can also provide site-specific measuring data regarding the health or technical status of the measuring unit. For example, for the present inventive system 1, the gage can e.g. be designed to detect a particular "event", e.g. 1 millimeter of rainwater entering the gage's tipping bucket through the top of its funnel. When the bucket tips, it pours out any water within, engaging a switch that transmits alert data and resetting the bucket. Any other sensors on the gage will also activate the alert data transmitter after detecting said specific event. On days without rain, the gages can e.g. transmit a "no rain" report to show that the device 102 is still working. In the embodiment variant with automated flood warning 12/121,122,123 the system 1 can e.g. use radio, cellular, or satellite telemetry to communicate with an alarm host computer or alarm network. The system 1 can also specifically operate alarm signals using radio frequencies and/or satellite and/or cellular telemetry. For the present system 1, it is to be noted that while streams and rivers can be monitored for many mearing qualities and parameters that they share with lakes, ponds and basins, streams and rivers possess one quality that differentiates them from other freshwater bodies, namely their movement. For the forecast processing by the present system, stream-flow can e.g. be an important measuring parameter that impacts many other aspects of a river's hydrology and water quality.

A geographic and/or topographic area 2 to be covered is captured by a predefined data structure 1005 of a flood map generator 100. The data structure 1005 at least comprises definable area parameters 10051 capturing geographic location 100511 and/or geographic extent 100523 of said geographic and/or topographic area 2, and generating a flood map 1007 by the flood map generator 100 based on the transmitted optical imaging sensory data 1021 using the predefined data structure 1005. The geographic and/or topographic area 2 can e.g. comprise unvarying landscape representative of area covered by dry land 24 and wetland 25.

Thus, the system 1 comprises said central measuring ground station 10 with a predefined data structure 1005 for capturing a geographic area 2 to be covered, the data structure 1005 at least comprising definable area parameters 10041 capturing geographic location 100511 and/or geographic extent 100512 of said geographic area 2. Predefined data structure 1005 comprises grid parameters 10033 for splitting the geographic area 2 to be covered by the spatial grid 1002 with equidistant or variable grid cells 1003 of definable or automatically adaptable size 10033 by means of a dynamic grid splitter 1001. The grid cells 1003 can e.g. be defined as two dimensional blocks of m×n size 10033. The two dimensional m×n blocks 1003 can e.g. be of approx. 8.72*10-5 radian size 10033. The dimensional m×n blocks 1003 can e.g. be of approx. 0.005*0.005 deg size 10033. Grid shape 10034 (curvilinear/structured or triangular/unstructured) and the selected grid size 10033 affect the output of the damage signaling or damage cover system 104. For the present system 1, e.g. dependent on the topology or geographic characteristics or desired resolution, structured, unstructured and/or hybrid grids 1002 can be applied.

Figure 14:
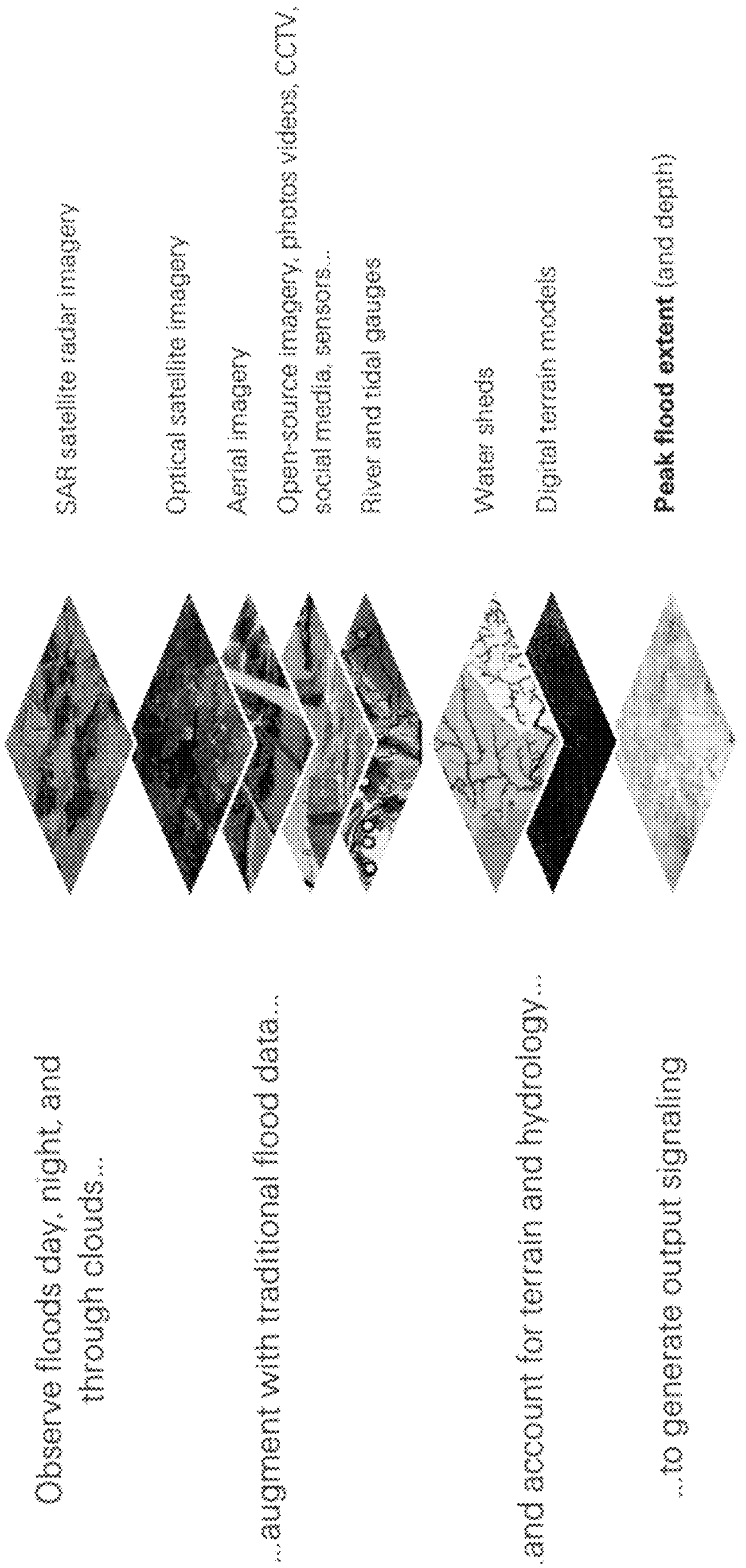
FIG. 14 schematically illustrates an exemplary flood map generation through multi-source measuring parameter processing.
Figure 15:
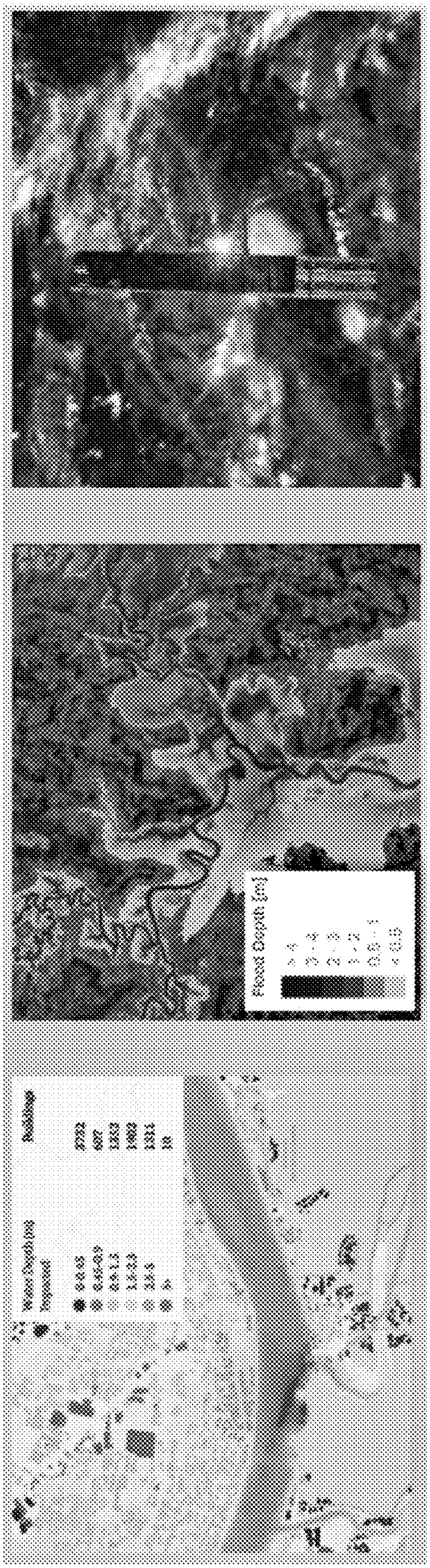
FIG. 15 schematically illustrates an exemplary processing of flood event footprints, where satellite data are measured, an object level of a high spatial resolution up to 1×1 meter is achieved, daily observations with any non-permanent water for >12 hours is detected and delivered near real time, and radar technology allows monitoring through clouds and at night.

To capture flood exposure or risk measuring data and to automatically trigger actions or alarm systems, detailed flood measuring parameters values 1021 are measured on depth of flooding and/or probability of flooding and/or other flooding characteristics, transmitted to the central measuring engine 10 and stored as grid measuring datasets (see FIG. 14, where the darker areas represent greater flood depths). The measuring grid cells 1003 can e.g. be realized as a digital raster dataset that defines geographic space as an array of equally or adjustably sized square cells 1003 arranged in rows and columns. The value in each cell represents the magnitude in that location of the flooding characteristic represented by that particular grid. Within a flood measuring parameter database, grids 1002 can be produced to reflect water surface elevations and/or depths and/or velocities and/or percent-annual-chances of flooding and/or other measuring values. The grids 1002 can e.g. be chosen based on the topography of a geographic area 2, e.g. being unique to coastal areas and dams.

In one embodiment, the grid cells measured as flooded are determined using, for example, a neural network approach, a double mesh approach, and the like. In addition, the network cells measured as not flooded do not contribute to the measured affected area of the AOI. Thereafter, the percentage (at reference number 10) of affected area is generated with the relation of AA/AOI. The payout is based on the pre-defined trigger depending upon the percentage of affected area.

With respect to FIG. 4 the present inventive system allowing to add weights to each cell of the spatial grid which improves the ability to measurably capture and reflect the actual riskiness of the underlying set of physical objects to be covered by the system located in the selected area. Depending on the size of the grid and the AOI this can end to be a large number of grid cells. Lower grid cell sizes will typically be better in capturing variation of flood, i.e. improve measure resolution, however this can be critical in respect to the required computational processing power.

A payout transfer structure can e.g. be used during occurrence of the flood event in relation to topography and exposure distribution. Each grid cell is assigned to a relative weight. The relative weight of all grid cells is sum up to a total of 1. The weight of the individual grid cells can e.g. be generated by the system by using a proxy seen best suited to reflect the distribution of the insured interest (aka values, exposure). All grid cells affected will result in a payout of 100% of a pre-definable agreed limit. Example: Suppose if 20 grid cells are affected, generate the total sum of the relative weight of these cells, for example, 57.14%. Against a predefined cover limit of USD 100 m, this automatically triggers a payout of 57.14 m. As an embodiment variant, the payout function can be linear (11) (straight linear), stepped or with (12) deductibles (franchise deductibles (13)). The automated system can e.g. select payout functions based on topography and exposure distribution. The payout function may cater to different terrain and exposure distribution with respect to a geographic area. The payout function provides different payout functions to the individual, and the individual is free to select one of the payout function. The payout function may further include suggestions from the individual.

For determining the payout scheme, a parametric coverage for the measured affected area may be generated by covering a possible loss associated with occurrence of the flood event and impacting a geographic area measured by the affected area. The possible loss incurred due to occurrence of the flood event may be determined as per an adjustable risk-transfer structure, a threshold measure. The possible loss incurred may be triggered by a threshold-trigger that is selected from the percentage of the affected area given by the measured affected area to the geographic area (for example, the AOI). By way of an example, the geographic area may include unvarying landscape that represents area covered by dry land and wetland.

In another embodiment, an electronic payment transfer may be made to the individual by an electronic payment transfer module. The electronic payment transfer may be done based on generated parametric coverage monetary pay-out parameter values. The electronic payment transfer to be made to the individual is limited and may be predefined based on prior discussion or agreement with the insured. In some scenarios, the individual may provide information related to the geographic area to be excluded for coverage under the payout scheme.

Figure 6:
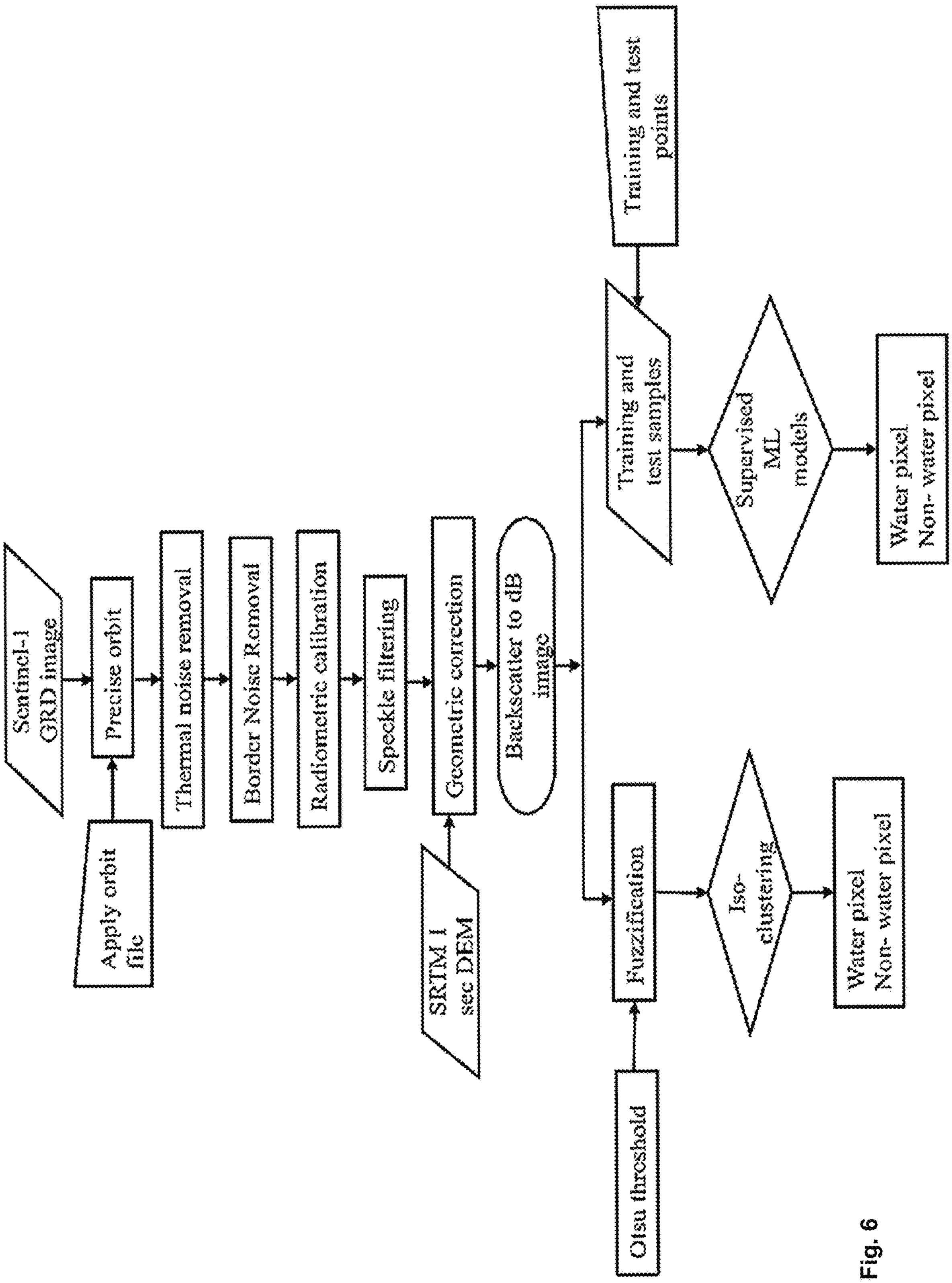
FIG. 6 is a schematic diagram, which illustrates the overall operation of one embodiment of the image processing in supervised and unsupervised machine structure to generate the flood maps.
Figure 7:
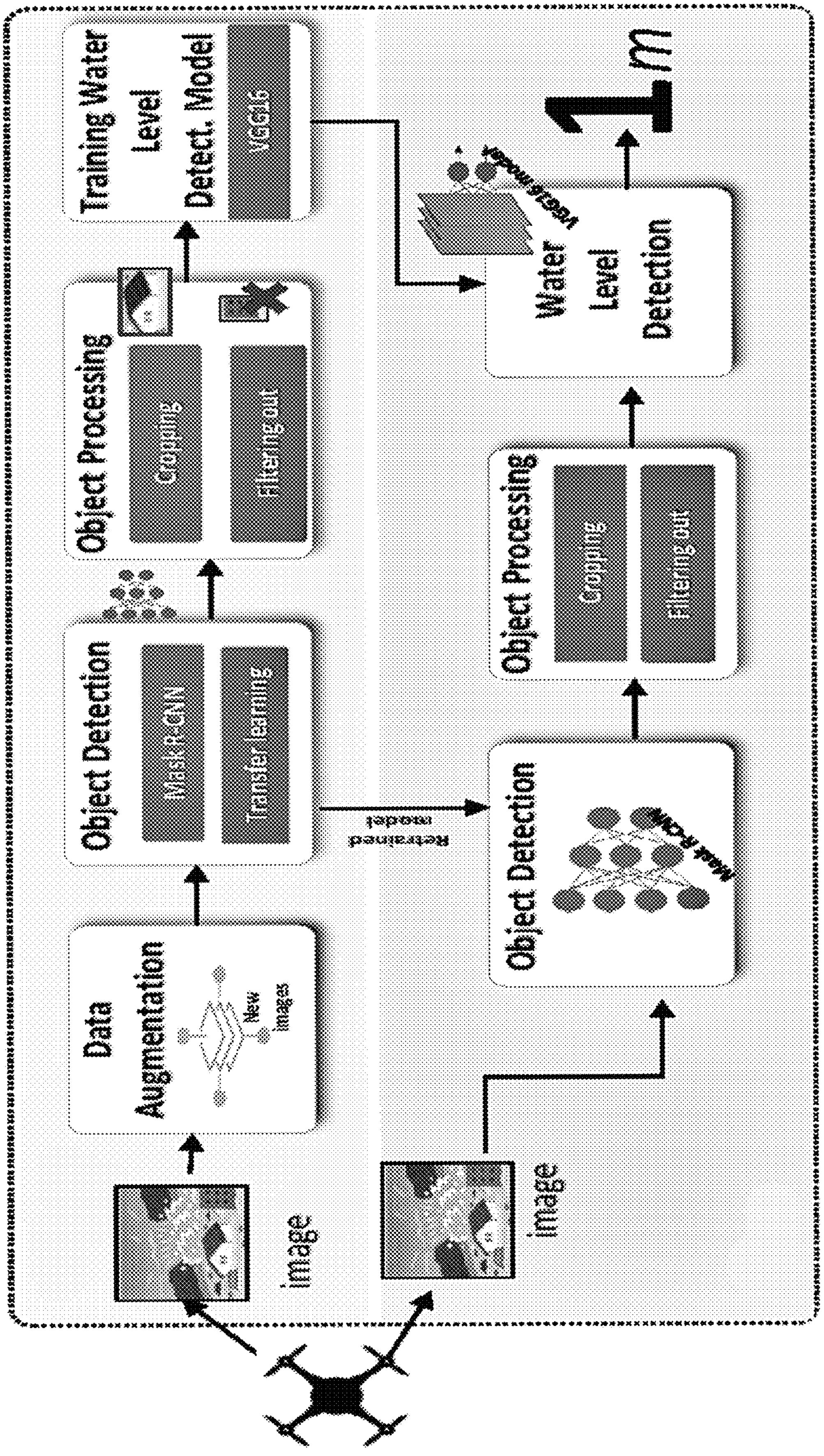
FIG. 7 is a schematic diagram, which illustrates the system architecture for optical damage recognition of a physical object comprising two stages (e.g. offline and online stages). The system is initialized in the first stage by collecting the required airborne and/or spaceborne captured imagery. These imagery represent different flood levels as well as imagery without any flood in the areas of interest. Due to the scarcity of the imagery in unusual situations like flood disasters, the collected imagery can e.g. be preprocessed by a data augmentation module to synthetically generate new images enabling the efficient application of deep learning techniques. Then, the system can e.g. build an object detection modelling structure, for example, using R-CNN by retraining the network on the available imagery. This modelling structure is responsible for classifying and segmenting objects in the airborne and/or spaceborne captured images, including e.g. buildings and cars. Based on the information obtained from each optical imagery, the system can e.g. use an object processing module to decide whether to consider or filter out the objects within the imagery. After that, the system can e.g. build and train a water level estimation model for identifying the water level from the objects detected in each image. During the second phase, the imagery captured by aerial and/or space-based optical sensing device can e.g. be forwarded to the object detection model, which is trained in the offline stage, for identifying and locating objects in the scene. These objects are fed to the water level estimation to measurably estimate the water level in the cell or area based on the optical sensed measuring values.
Figure 8:
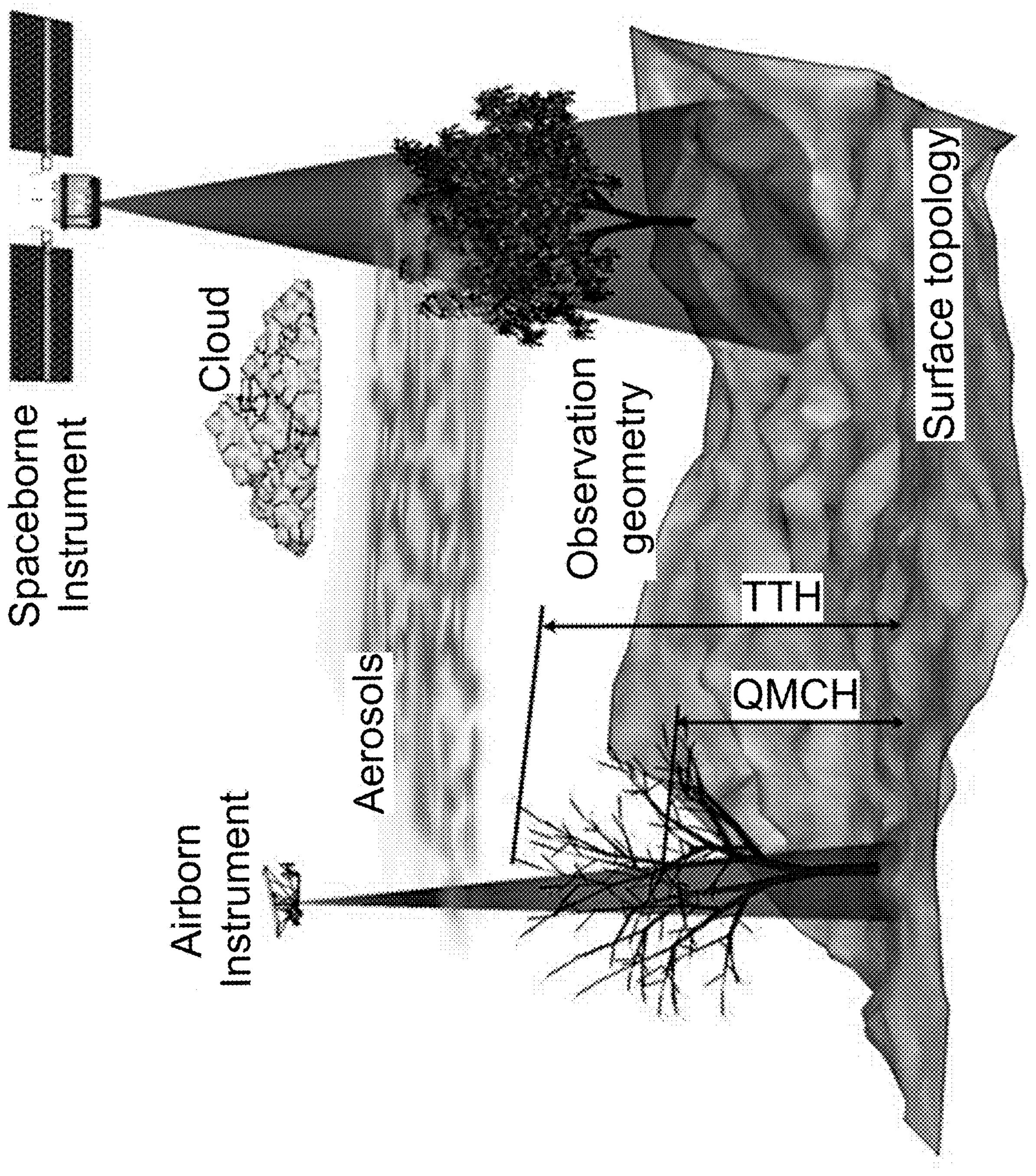
FIG. 8 is a schematic diagram, which illustrates optical measurement of the surface topography and/or geometry by means of the airborne and/or spaceborne optical sensing devices, for example, comprising unmanned or manned aircrafts and/or drones and/or zeppelins and/or satellites and/or spacecrafts equipped with optical sensing devices.
Figure 9:
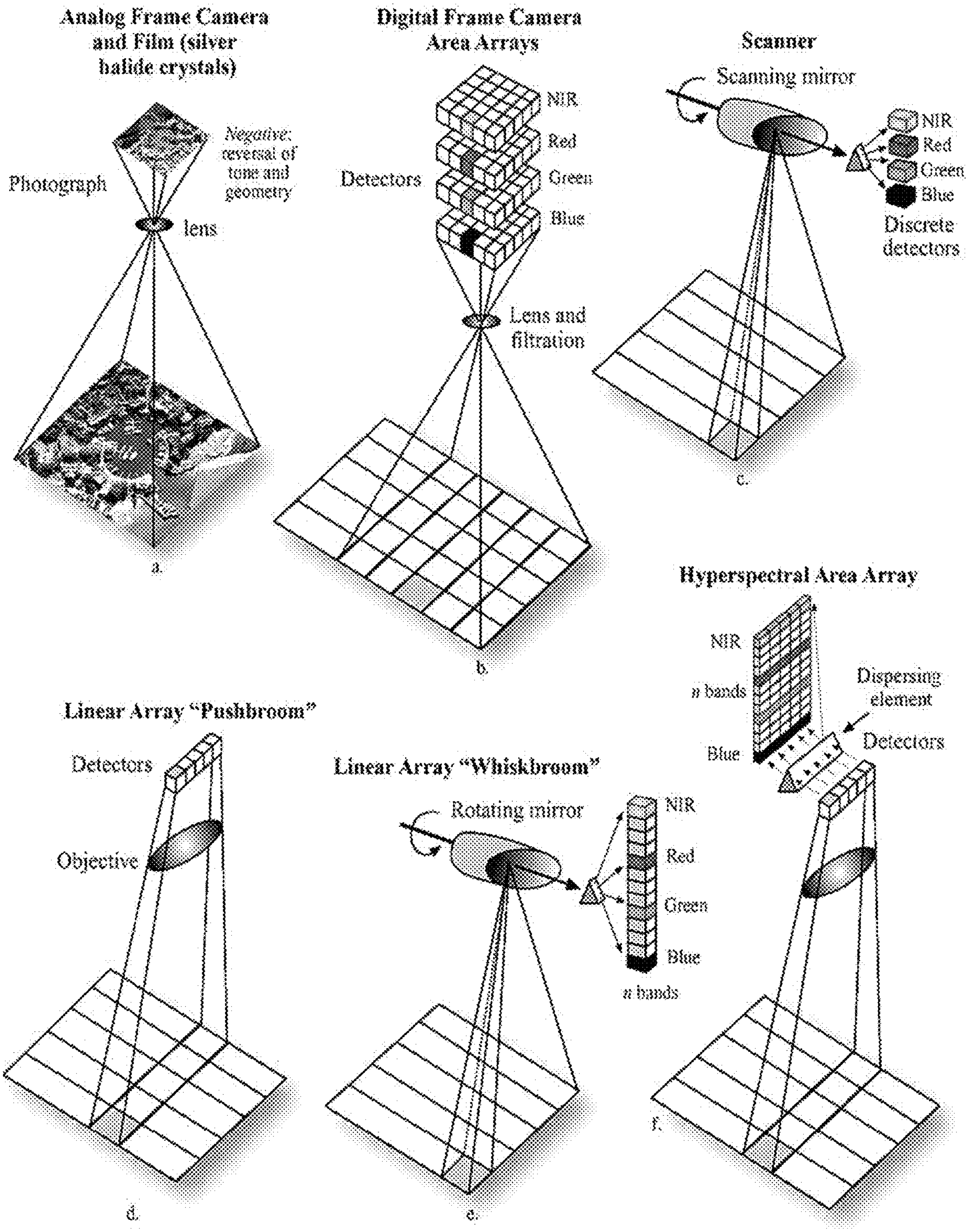
FIG. 9 is a schematic diagram, which illustrates the used optical remote sensing devices used to measure the aerial and/or space-based imagery, multispectral and/or hyperspectral imagery.
Figure 10:
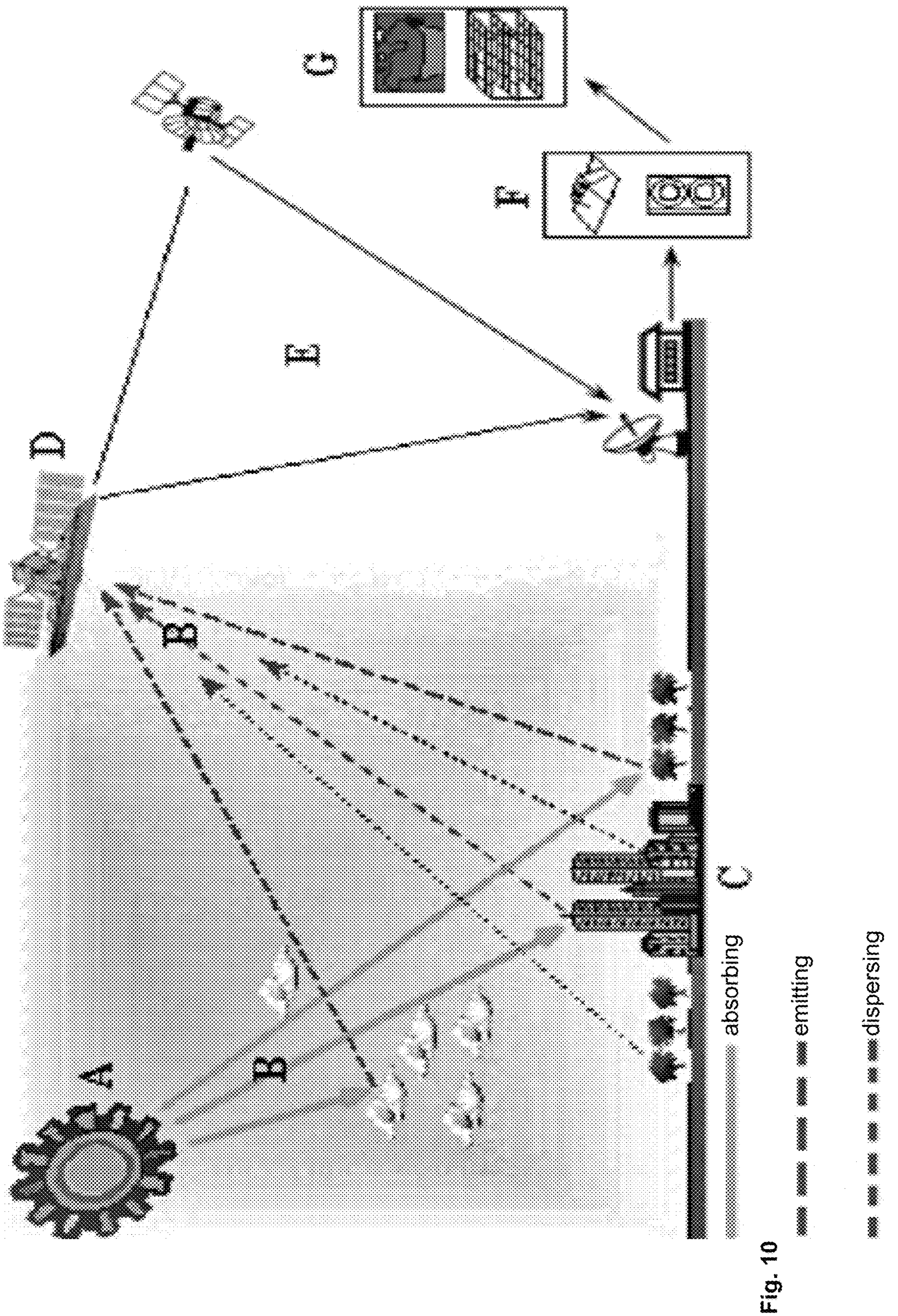
FIG. 10 is an exemplary diagram schematically illustrating an optical satellite-based sensory system, where A denotes the sunlight source, B the optical wave spectrum interacting with absorbing, emitting, and dispersing objects, D the satellite sensing device, E the data transmission link to the ground station of the system 1, F the topological object recognition and G the RGB-based recognition as one of the embodiment variants.
Figure 11:
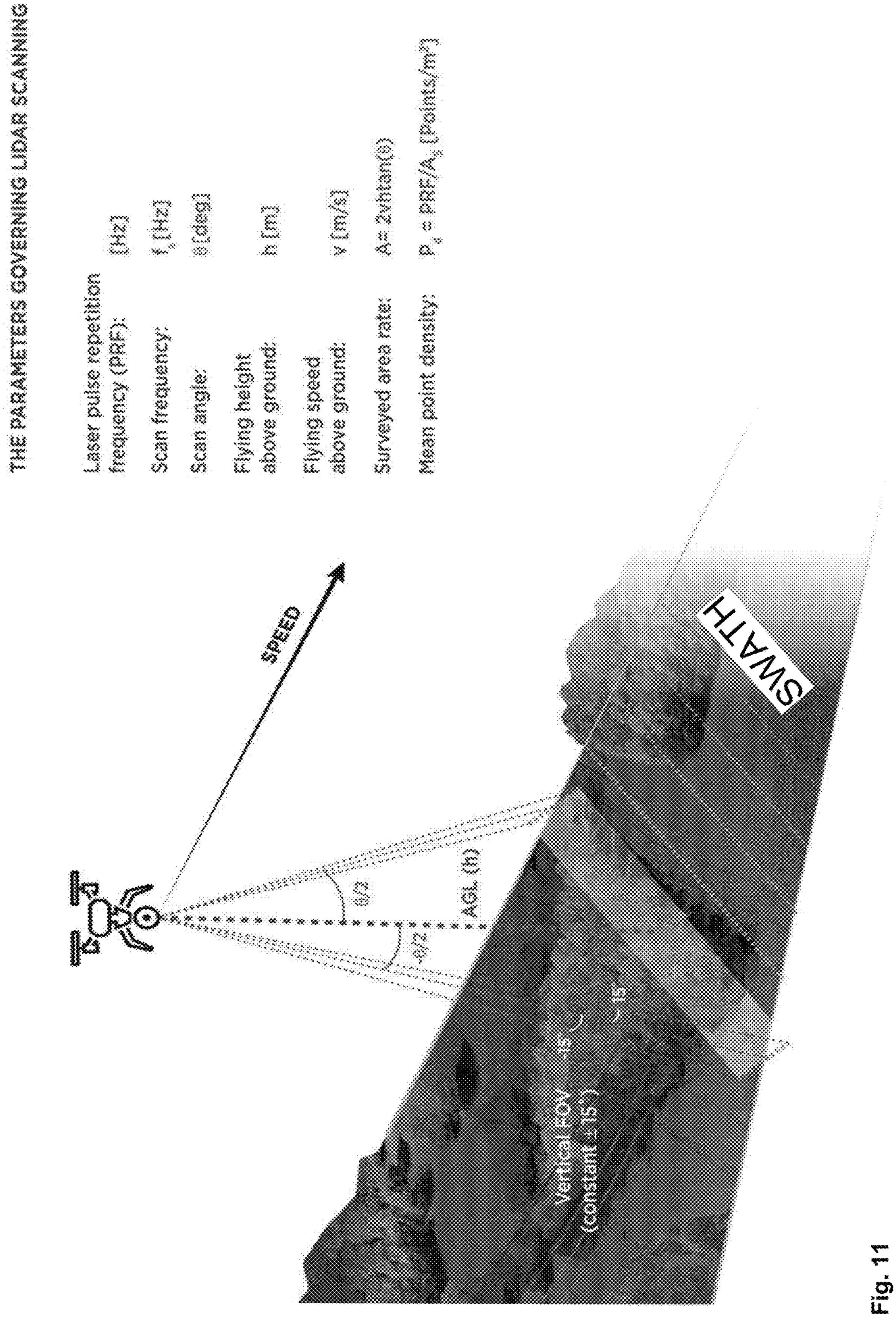
FIG. 11 is an exemplary diagram schematically illustrating optical measurements by a light detection and ranging system (Lidar). Thus it is to be noted that the aerial and/or space-based imagery, multispectral and/or hyperspectral imagery can e.g. comprise imagery of Lidar systems of the inventive system. The Lidar systems measure ranges (variable distance) by targeting an object or a surface with a laser and measuring the time for the reflected light to return to the receiver. According to the invention, the Lidar systems can also be used to make digital 3-D representations of areas on the Earth's surface and flooded area bottom by varying the wavelength of light.
Figure 12:
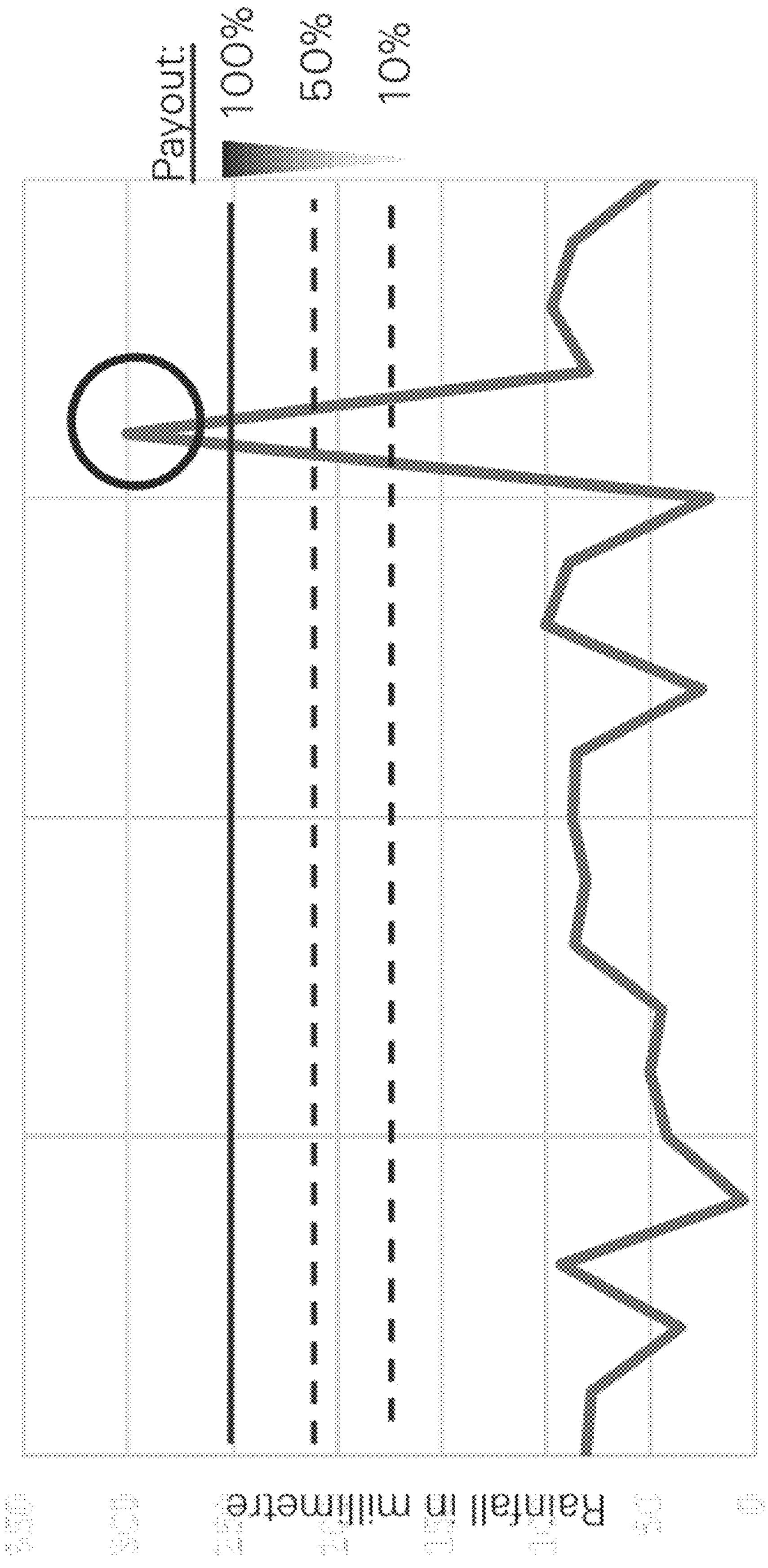
FIG. 12 schematically illustrates an exemplary parametric risk-transfer relying on the measurement of a natural physical measuring parameter or index (parameter). Automated cover by a payout transfer given by a predefined amount is made when a predefined threshold of parameter/index is exceeded (e.g. amount of rainfall, flood at location).
Figure 13:
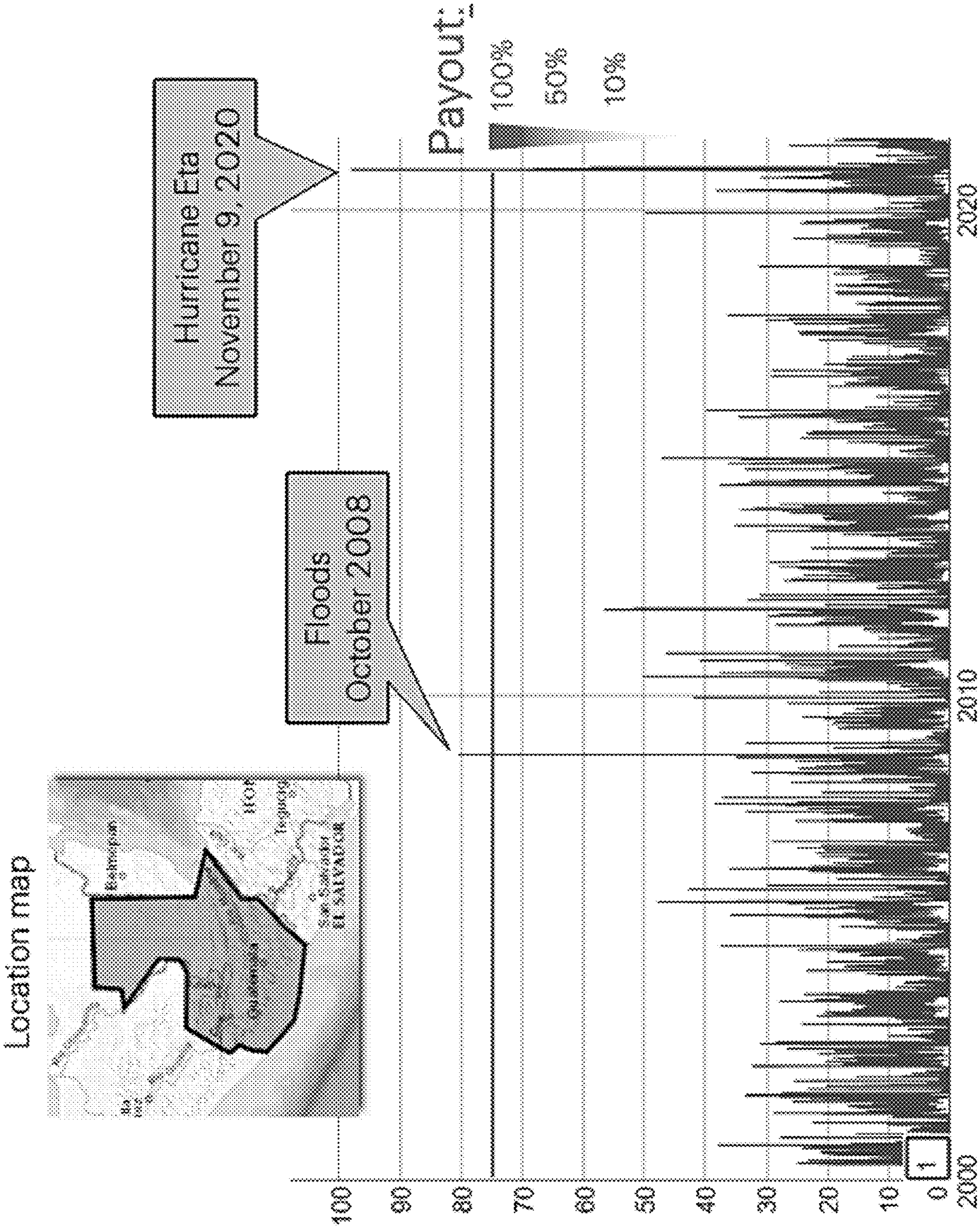
FIG. 13 schematically illustrates an exemplary parametric excess rainfall risk-transfer (as a proxy for flood). Daily average rainfall amounts over Central America measured by satellite measuring data. An aggregated amount of rolling observation window (e.g. 2-days) must exceed pre-defined rainfall levels. It is to be noted that rainfall≠floods on the ground.

In yet another embodiment, the risk-assessment parameters used to determine occurrence of the flood event may be accessed using a Machine Intelligence (MI) approach (see FIGS. 6 and/or 7). The machine-learning approach may connect flood related measurements of various geographic areas for assessing and/or predicting overall risks by a risk transfer module. In addition, the machine-learning (ML) approach may be used to predict a future risk pertaining to occurrence of the flood event, and/or allowing to associate varied losses incurred in the multiple geographic areas due to occurrence of the flood event leading to generation of risk factors for an associated reinsurance module.

As an embodiment variant, the grid cells 1003 measured as flooded 10031 can e.g. be determined using at least an artificial intelligence as machine-learning approach based data-processing structure and/or a machine-learning-based data-processing structure. It is to be noted that the present inventive system generally can also be operated applying one or more types of numerical modeling structures for predictive flood parameter generation. For example, a hydrological rainfall run-off modeling structure can e.g. be used to forecast distributed river discharges. Also a one-dimensional (1D) drainage modeling structure can e.g. be applied based on the one-dimensional Saint-Venant flow forecasting to predict surcharges or drainages. Further, also a two-dimensional (2D) Saint-Venant flow forecast can e.g. be used for simulating the surface inundation, and obtain a forecasted maximum flood extents, maximum depths, and flow velocity on defined points on the surface. Furthermore, a 1 D-2D coupling structure can be applied. All proposed embodiment variant relies on sensory and/or field measurements for capturing the inventive input parameters and their specific technical selection. However in a preferred embodiment variant, the system relies on a data-driven approach for establish a reliable flood forecast structure based on flood measurements. Unlike the numerical structure, the inventive data-driven, physical-based measuring and forecast system requires measuring input/output data only. The inventive data-driven structure has shown its high performance especially for the technical nonlinear flood forecast problems. In particular, ANN-based forecast structures can be applied, however the technical problem of over-fitting or under-fitting the measuring data, and insufficient length of the data sets can lead to erroneous forecast output results. To expand the data-driven forecast structures for short and long term flood forecasts, combined use of neuro-fuzzy structures and/or support vector machine (SVM) and/or support vector regression and/or artificial neural network (ANN) are also possible. More particularly, artificial neural network showed to be a reliable technique for the inventive flood prediction, as for forecasting water levels by applying ANN forecast structures to conventional hydrological modeling in flood-prone catchments. In another embodiment variant, the water level forecast results along a river uses backpropagation and/or conjugate gradient and/or cascade correlation. One possibility is to combine a Levenberg-Marquardt Back-propagation with cross-validation to prevent the under-fitting and overfitting in daily reservoir inflow forecasting.

Finally, in another preferred embodiment variant, the maximum flood inundation in a geographic area is determined by machine-learning based structure applying a back-propagation networks based on multiple inflow measuring data for a grid resolution of m×n. This ANN technique allows for a geographic area to provide high-resolution flood inundation maps from river flooding. For the prediction of maximum flood inundation, only the real-time discharges of the upstream catchments or flood level measurements are needed. The procession consists of two phases: the training phase collects a part of the measuring data from the existing database, tuning the model by changing the weights on input arcs to minimize the bias on the output layer; the recalling phase produces the new outputs for the testing inputs. The rest individuals in the training dataset are used for evaluating the behavior of the network structure. The total bias between the output of ANN and the observed values is defined as the error function. In order to reduce the error function in each iteration, the weights are modified automatically by the system 1. Herein, the learning rate is used for automatedly scaling the gradient in each iteration of the weight update. It is to be noted that the system can be sensitive to select up the correct value, since a large learning rate can miss the optimal point, while a small learning rate can slow the training process. For example, the gradient descent algorithm can be used by the system 1 to generate the update of the weights values. To speed up the convergence of the iteration, resilient backpropagation can e.g. be applied in the present case for treating the update of weight values differently depending on the derivative of the error function. For optimization, larger alternative learning rate can e.g. be set for speeding up the iterations if the error gradient remains in the same direction in neighboring time-steps and smaller alternative learning rate when approaching the optimal weights.

Due to the total number data of measuring grid cells 1003 (resolution of m×n), a single hidden layer can exceed 365 thousand elements. To technically optimize the storage requirement and the ANN structure training time, the geographic area 2 can e.g. be subdivided into 50×50 cell-squared grids 1002, each grid 1002 having its own independent ANN structure (the output layer having 1400 elements). It is to be noted that with the same inventive technical approach, instead of measuring the real-time discharges of the upstream catchments for the prediction of maximum flood inundation, rainfall measurements and/or flood level measurements can be selected as input measuring values for the machine-learning-based structure. To optimize the ANN processing technically further, clustering can be applied to the training measuring dataset. Like this, the size of the training measuring dataset can optimize and reduced while still keeping the main representative events. As such the training time can be reduced and the overfitting effects minimized. Further, to measure the technical performance of the prediction processing of maximum flood inundation by the applied ML structure, the mean squared error (MSE) of each grid can e.g. be used. It is assumed that the flood maps from the events used are the observed values. As each grid 1002 has its own independent training network, the MSE can e.g. be measured using all the grid cells 1003 in each grid 1002.

The flooding extent value 44 and/or flooding impact measure value 45 of the affected area 21 is measured based on the network points 1008 measured as flooded 10081 to the total number of network points of the geographic and/or topographic area 2.

A dynamic parametric flood impact cover 1031 fora physical object 3/31 physically impacted by the occurrence of the flood event 4 is generated by the system 1 by using an adaptive damage-cover structure 1041 based on the measured flooding extent value 44 and/or the flooding impact measure value 45. The parametric coverage 1031 is generated covering a possible loss associated with the occurrence of the flood event 4 impacting the geographic area 2 measured by the affected area 21, as per the adjustable damage-cover structure 1041 a flood threshold measure 1031 is triggered by an electronic threshold-trigger 103. The threshold-trigger is selected from a measured percentage value 23 given by the measured affected area 21 to the geographic area 2 or the measured affected network points 100811 to the total number of network points 100813. By an electronic payment transfer module based on the generated parametric coverage 1031 monetary pay-out parameter values are transferred by electronic payment transfer to an impacted physical object 3/31 and/or a risk-exposed individual associated with an impacted physical object 3/31. A premium value can e.g. be generated based on the payout coverage 1031 associated with a measurement.

While a number of features are described herein with respect to embodiments of the inventions; features described with respect to a given embodiment also may be employed in connection with other embodiments. The following description and the annexed drawings set forth certain illustrative embodiments of the inventions. These embodiments are indicative, however, of but a few of the various ways in which the principles of the inventions may be employed.

LIST OF REFERENCES

1 Airborne and/or spaceborne optical flood sensory system
- 10 Central ground station/Central measuring engine
  - 100 Flood map generator
    - 1000 Data aggregation and preprocessing module
    - 1001 Dynamic grid splitter
    - 1002 Topographic or geographic grid
      - 10021, . . . , 1002*i* Measuring parameters for grid cell i
    - 1003 Measuring grid cells
      - 10031 Grid cells measured as floated/affected
      - 10032 Grid cells measured as not floated/affected
      - 10033 Grid cell size
      - 10034 Grid cell shape
      - 10035 Grid cell weight
      - 10036 Object density-based weightage value of gird cell
      - 10037 Normalized grid cell weight
    - 1004 Persistence storage
    - 1005 Predefined data structure
      - 10051 Area parameter
        - 100511 Geographic location
        - 100512 Geographic extend
    - 1006 Machine-learning based or AI-based module
  - 102 Flood measuring devices/Flood measuring sensors
    - 1021 Flood measuring parameters
    - 1022 Loopback signaling
    - 1023 Air-based optical measuring devices
    - 1024 Space-based optical measuring devices
    - 1025 Flood measuring gages with telemetry equipment
  - 103 Electronic flood trigger
    - 1031 Dynamic parametric flood impact cover
    - 1032 Flood threshold measurands
    - 1033 Flood threshold value
  - 104 Damage-signaling and/or damage-cover system
    - 1041 Adaptive damage-cover structure
    - 1042 First resource-pooling system
      - 10421 First resources
    - 1043 Second resource pooling system
      - 10431 Second resources
    - 1044 Electronic cover activation signaling and triggering
    - 1045 Risk transfer parameter value optimization
    - 1046 Cover activation function/Electronic payout function (signaling)
      - 10461 Linear payout function
      - 10462 Stepped payout function
      - 10463 Payout function with deductibles (franchise deductibles)
- 11 Data Transmission network
- 12 Alarm signaling devices
  - 121 Steering signaling to automated flood-alarm driven devices
  - 122 Acoustic alarm signal devices
  - 123 Digital alarm messaging system

2 Geographic area
- 21 Affected area
- 22 Not affected area
- 23 Measured percentage value of affected area vs total geographic area
- 24 Dry land area
- 25 Wet land area

3 Physical Objects in the geographic area (Flood exposed object)
- 31 Physical object in a grid cell
- 32 Physical damage or loss to the object impacted and caused by the occurring flood event

4 Flood event
- 41 Temporal occurrence
- 42 Geographic/topographic location
- 43 Event Strength

5 Process Flow
- 51 Central measuring engine with cover activation signaling and triggering
- 52 Damage cover activation by resource transfer/Payout function
- 53 Payout parameter value generation and payout Trigger
- 54 Electronic reporting/Independent third party system
- 55 Flood exposed object/Risk exposed individual
- 56 Damage-cover system/Risk-transfer system
- 57 Automated pricing/Premium transfer

The invention claimed is:

1. An airborne and/or spaceborne optical flood sensory method for measuring and/or forecasting a weightage-specific, quantitative flooding measure value and a weightage-specific, quantified flooding impact measure value, the weightage being based on an object density of a topographic area impacted by an occurrence of a flood event, the method comprising:
   - measuring, by aerial and/or space-based remote sensing devices, digital imagery sensory data;
   - transmitting said digital imagery sensory data via a data transmission link to a central ground station;
   - capturing, by a predefined data structure of a flood map generator, the topographic area, the predefined data structure at least comprising definable area parameters capturing a geographic location and/or a geographic extent of said topographic area;
   - generating, by the flood map generator, a flood map with elevation measures measured based on the transmitted digital imagery sensory data and leveraged measuring data using the predefined data structure;

splitting, by the central ground station, the topographic area by a spatial grid with adjusted grid cells of an adjustably determined size;

detecting and automatically locating by a light detection and ranging system (LiDAR) physical objects at least comprising buildings or constructions and how close a physical object lies to a flood zone or within which flood zones the physical object lies, wherein the light detection and ranging system (LiDAR) measures variable distances by ranges targeting objects or surfaces with a laser and measuring the time for a reflected light to return to a receiver;

aggregating, for each grid cell or group of grid cells of the spatial grid, definable physical objects located in a specific grid cell or group of grid cells;

generating for each grid cell or group of grid cells an object density-based weightage value;

applying a normalized weight to each of the grid cells by dividing a weight per grid cell with a sum of weights for all the grid cells of the grid;

measuring, after the occurrence of the flood event, an affected area of said topographic area based on measuring a flooding within the grid cells of the spatial grid, grid cells measured as flooded contributing to the measured affected area while grid cells measured as not flooded are contributing to an area measured as not affected;

measuring a summed up value of the normalized weights for all the affected grid cells; and measuring a flooding extent measure and/or flooding impact extent measure value of the affected area based on a pre-defined trigger and said summed up value of normalized weights.

2. The method according to claim 1, wherein the measuring of the flooding within the grid cells of the spatial grid is based on a measured total flooding of a grid cell and/or a definable flooded minimum percentage of a grid cell.

3. The method according to claim 1, wherein the object density-based weightage value is set to 0 to grid cells of the spatial grid having a lower interest, excluding those grid cells from measurements.

4. The method according to claim 1, further comprising assigning, for an operation of the pre-defined trigger, a relative weight to each grid cell, wherein aggregated relative weights of all grid cells sum up to a total value of 1.

5. The method according to claim 4, further comprising determining the relative weight of each grid cell by a proxy weight adjusted to reflect a specific distribution of pre-defined object-specific and/or exposure-specific values of the definable physical objects located in the grid cells of the spatial grid.

6. The method according to claim 1, further comprising triggering, in a case of all grid cells being measured as affected, monetary payout transfer of 100% of a pre-definable maximal cover.

7. The method according to claim 1, further comprising:

providing a dynamic parametric flood impact cover for an object physically impacted by the occurrence of the flood event by using an adaptive risk-transfer structure based on the flooding extent measure value and/or the flooding impact extent measure value, generating parametric coverage covering a possible loss associated with the occurrence of the flood event and impacting the geographic and/or topographic area measured by the affected area, by the adaptive risk-transfer structure adjusted based on the trigger and the measured flooding extent measure value and/or flooding impact extent measure value, and transferring, by an electronic payment transfer module, based on the generated parametric coverage monetary pay-out parameter values by electronic payment transfer to an individual.

8. The method according to claim 1, wherein cell grids are measured as flooded when each grid cell of a specified area is flooded.

9. The method according to claim 1, wherein the grid cells are regularly spaced within the spatial grid with a predefinable spacing.

10. The method according to claim 9, wherein the grid cells are essentially 500 m×500 m and/or 0.005×0.005 deg grid cells.

11. The method according to claim 9, wherein the grid cells represent two dimensional m×n blocks.

12. The method according to claim 1, wherein the topographic area includes unvarying landscape representative of an area covered by dry land and wetland.

13. The method according to claim 1, wherein the occurrence of the flood event is detected using loopback signalling.

14. The method according to claim 1, wherein the grid cells measured as flooded are determined using at least a neural network approach.

15. The method according to claim 1, wherein the aerial and/or space-based remote sensing devices at least include unmanned or manned aircraft systems, and/or drones comprising airborne optical measuring systems, and/or satellites, and/or spacecrafts comprising spaceborne optical measuring systems.

16. The method according to claim 1, wherein the affected area is measured using on-air imaging devices.

17. The method according to claim 1, further comprising generating a premium based on a selected payout coverage.

18. An optical-based flood impact measuring and forecasting system for measuring and/or forecasting a weightage-specific, quantitative flooding measure value and a weightage-specific, quantified flooding impact extent measure value, the weightage being based on an object density of a topographic area impacted by an occurrence of a flood event, the system comprising:

aerial and/or space-based remote sensing devices configured to measure digital imagery sensory data and transmit said digital imagery sensory data via a data transmission link to a central ground station, a flood map generator including a predefined data structure and configured to capture the topographic area, the predefined data structure at least comprising definable area parameters capturing a geographic location and/or geographic extent of said topographic area; and generate a flood map with elevation measures measured based on the transmitted digital imagery sensory data and leveraged measuring data using the predefined data structure, the topographic area being split by a spatial grid with adjusted grid cells of an adjustably determined size, a density aggregator configured to detect and automatically locate by a light detection and ranging system (LiDAR) physical objects at least comprising buildings or constructions and how close a physical object lies to a flood zone or within which flood zones the physical object lies, wherein the light detection and ranging system (LiDAR) measures variable distances by ranges targeting objects or surfaces with a laser and measuring the time for a reflected light to return to a receiver, aggregate, for each grid cell or group of grid cells of the spatial grid, definable physical objects located in a specific grid cell or group of grid cells; generate for each grid cell or group of grid cells an object density-based weightage value; and apply a normalized weight to each of the grid cells by dividing a weight per grid cell with a sum of weights for all the grid cells of the grid, a flood detector configured to measure, after the occurrence of the flood event, an affected area of said topographic area based on measuring a flooding within the grid cells of the spatial grid, grid cells measured as flooded contributing to the measured affected area while grid cells measured as not flooded are not contributing to the measured affected area, and a trigger configured to measure a summed up value of the normalized weights for all the affected grid cells; and measure a flooding extent measure value and/or flooding impact extent measure value of the affected area based on a pre-defined trigger function and said summed up value of normalized weights.

19. The system according to claim 18, wherein a parametric coverage is generated covering a possible loss associated with the occurrence of the flood event and impacting the geographic and/or topographic area measured by the affected area, as per an adjustable risk-transfer structure a threshold measure and is triggered by a threshold-trigger, the threshold-trigger is selected from a weighted percentage of the affected area given by the weighted affected grid cells, and by an electronic payment transfer module, based on the generated parametric coverage, monetary pay-out parameter values are transferred by electronic payment transfer to an individual.

20. The system according to claim 18, wherein the grid cells are measured as flooded when each grid cell of a specified area is flooded.

21. The system according to claim 18, wherein the grid cells are regularly spaced within the spatial grid with a pre-definable spacing.

22. The system according to claim 21, wherein the grid cells are essentially 500 m×500 m and/or 0.005×0.005 deg grid cells.

23. The system according to claim 18, wherein the grid cells are defined two dimensional m×n blocks.

24. The system according to claim 18, wherein the topographic area includes unvarying landscape representative of an area covered by dry land and wetland.

25. The system according to claim 18, wherein the occurrence of the flood event is detected using loopback signalling.

26. The system according to claim 18, wherein a premium is calculated based on a selected payout coverage.

27. The system according to claim 18, wherein mesh network points measured as flooded are determined using at least a neural network approach.

* * * * *